(12) United States Patent
Ichida et al.

(10) Patent No.: US 7,011,590 B2
(45) Date of Patent: Mar. 14, 2006

(54) SHIFT ASSIST APPARATUS FOR A BICYCLE TRANSMISSION

(75) Inventors: Tadashi Ichida, Ikoma (JP); Kazuhiro Fujii, Kawachinagano (JP)

(73) Assignee: Shimano, Inc., Sakai (JP)

( * ) Notice: Subject to any disclaimer, the term of this patent is extended or adjusted under 35 U.S.C. 154(b) by 433 days.

(21) Appl. No.: 10/616,171

(22) Filed: Jul. 8, 2003

(65) Prior Publication Data

US 2005/0009651 A1    Jan. 13, 2005

(51) Int. Cl.
*F16H 63/04* (2006.01)
*F16H 61/32* (2006.01)

(52) U.S. Cl. .............................. 474/70; 474/80; 474/82

(58) Field of Classification Search ................. 474/70, 474/78, 80–82; 74/473.14, 473.16, 502.2, 74/501.6, 502.4, 502.5, 502.6, 535, 529, 74/594.6, 489, 474.12
See application file for complete search history.

(56) References Cited

U.S. PATENT DOCUMENTS

| | | | | |
|---|---|---|---|---|
| 4,143,557 A | * | 3/1979 | Wakebe et al. ............... | 474/80 |
| 5,020,387 A | * | 6/1991 | Nagano ..................... | 74/502.2 |
| 5,261,858 A | * | 11/1993 | Browning .................... | 474/69 |
| 5,358,451 A | * | 10/1994 | Lacombe et al. ............. | 474/78 |
| 5,618,241 A | * | 4/1997 | Ose .............................. | 474/80 |
| 6,607,457 B1 | * | 8/2003 | Kawakami .................... | 474/80 |
| 6,691,591 B1 | * | 2/2004 | Tsumiyama et al. ........ | 74/502.2 |
| 6,767,308 B1 | * | 7/2004 | Kitamura ....................... | 477/7 |
| 6,868,752 B1 | * | 3/2005 | Tetsuka et al. ............... | 474/80 |
| 6,899,649 B1 | * | 5/2005 | Ichida et al. .................. | 474/70 |
| 2003/0092519 A1 | * | 5/2003 | Fukuda ........................ | 474/70 |

FOREIGN PATENT DOCUMENTS

EP         1232940 A2 *  8/2002

* cited by examiner

*Primary Examiner*—Marcus Charles
(74) *Attorney, Agent, or Firm*—James A. Deland

(57) ABSTRACT

An assisting apparatus for using power from a moving member to assist the operation of a bicycle transmission comprises a power transfer mechanism, a drive coupling mechanism, and a position maintaining mechanism. The power transfer mechanism moves in one of a first direction and a second direction to upshift the bicycle transmission, and the power transfer mechanism moves in the other one of the first direction and the second direction to downshift the bicycle transmission. The drive coupling mechanism couples the power transfer mechanism to the moving member to move the power transfer mechanism in one of the first direction and the second direction, and the position maintaining mechanism prevents the power transfer mechanism from moving in the other one of the first direction and the second direction.

36 Claims, 29 Drawing Sheets

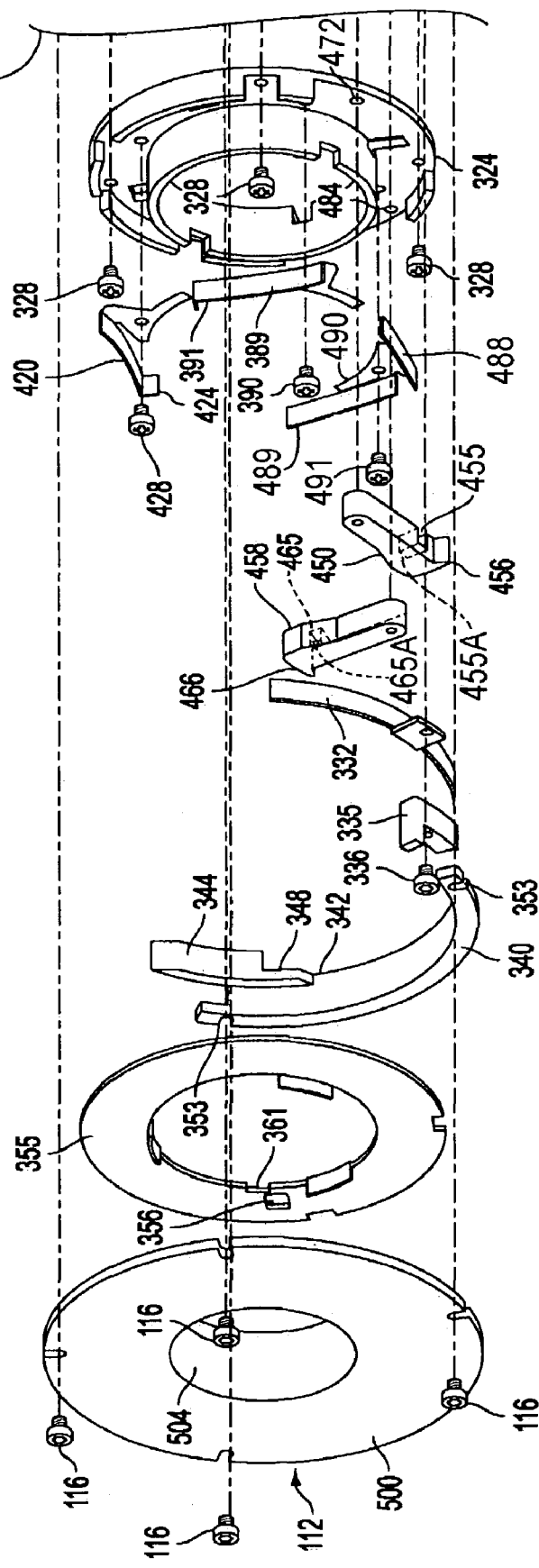

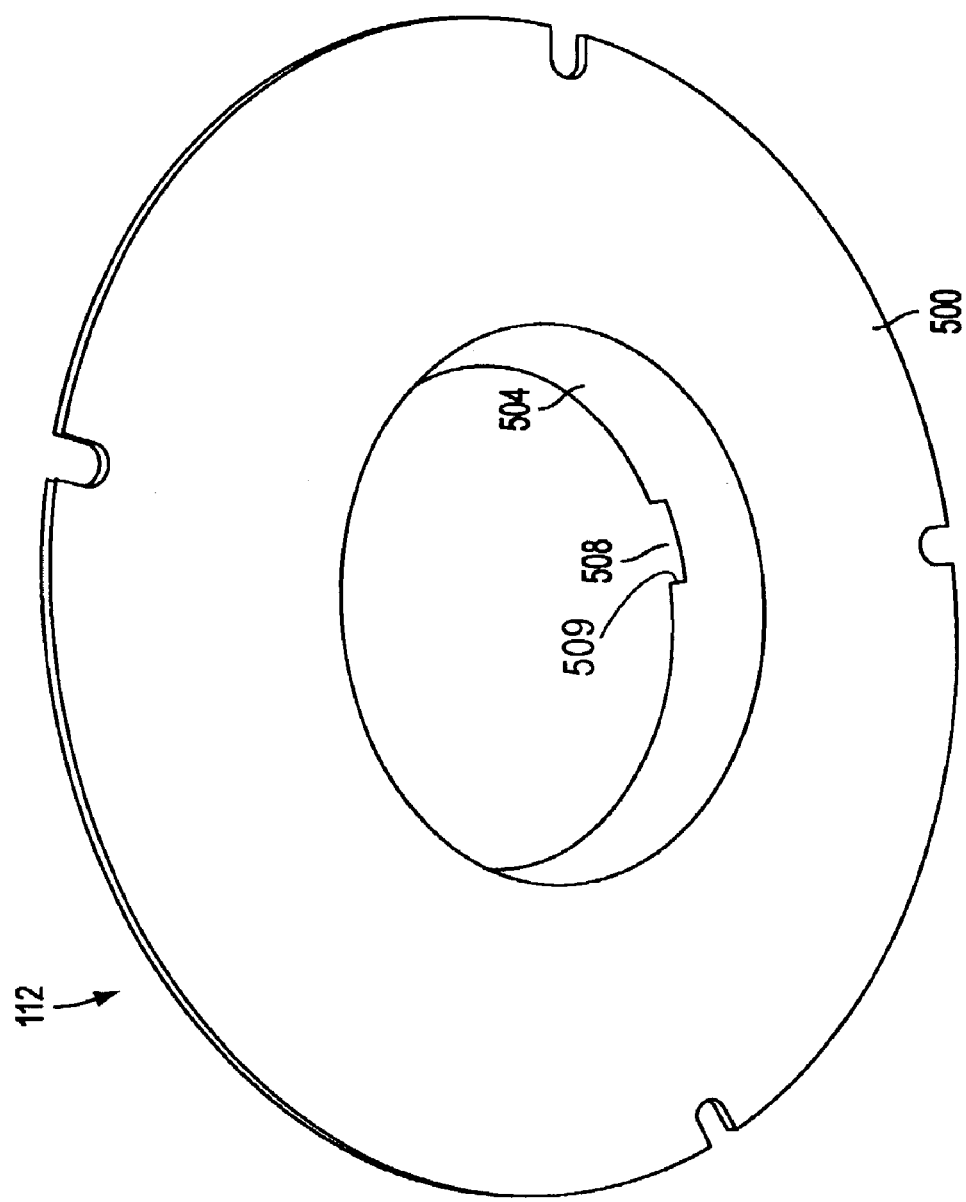

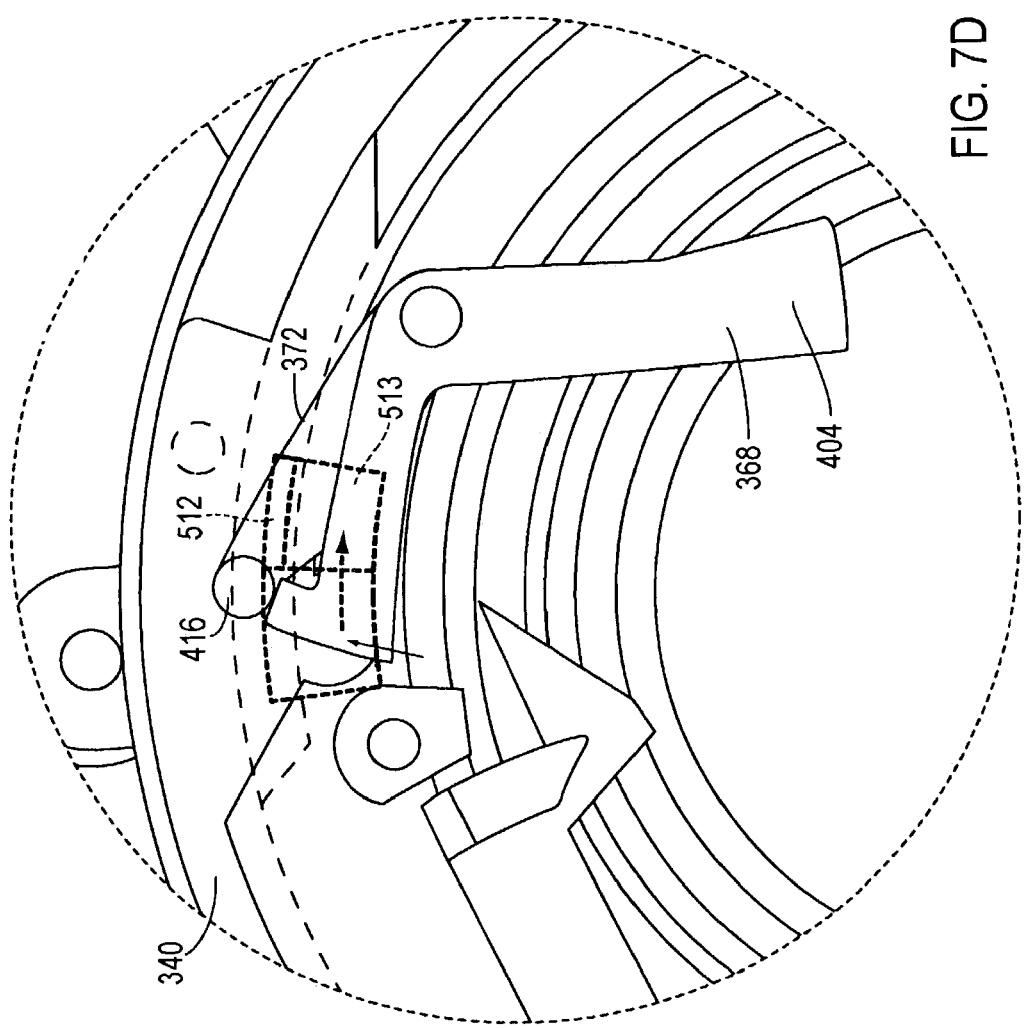

SHIFT ASSIST APPARATUS FOR A BICYCLE TRANSMISSION

BACKGROUND OF THE INVENTION

The present invention is directed to bicycles and, more particularly, to inventive features of an apparatus for assisting the operation of a bicycle transmission.

Various devices have been developed to help reduce the effort needed to operate bicycle transmissions such as derailleurs and internal hub transmissions. Examples of such devices particularly suited to assist the operation of derailleur transmissions are shown in U.S. Pat. No. 5,358,451. The devices shown therein for assisting the operation of a rear derailleur employ multiple moving parts that are in constant motion, thus increasing the amount of moving mass as well as the possibility of premature wear on the components. Devices used to assist the operation of a front derailleur employ solenoids that engage cams that rotate with the front pedal assembly, thus requiring precision timing of the solenoid.

The assignee's copending application Ser. No. 10/190,461 discloses an assist mechanism for a bicycle transmission that overcomes such problems. More specifically, that application discloses an assisting apparatus for using power from a moving member to assist the operation of a bicycle transmission, wherein the assisting apparatus comprises a mounting unit; an input transmission member coupled to the mounting unit, wherein the input transmission member moves between at least a first input position and a second input position; and an output transmission member coupled to the mounting unit, wherein the output transmission member moves between at least a first output position and a second output position. A moving member engaging member moves between a moving member engaging position and a moving member disengaging position, and a motion transmitting mechanism transmits motion from the moving member engaging member to the output transmission member. A switching mechanism moves the moving member engaging member between the moving member engaging position and the moving member disengaging position in response to movement of the input transmission member and the output transmission member.

SUMMARY OF THE INVENTION

The present invention is directed to inventive features of an apparatus for assisting the operation of a bicycle transmission. In one embodiment, an assisting apparatus for using power from a moving member to assist the operation of a bicycle transmission comprises a power transfer mechanism, a drive coupling mechanism, and a position maintaining mechanism. The power transfer mechanism moves in one of a first direction and a second direction to upshift the bicycle transmission, and the power transfer mechanism moves in the other one of the first direction and the second direction to downshift the bicycle transmission. The drive coupling mechanism couples the power transfer mechanism to the moving member to move the power transfer mechanism in one of the first direction and the second direction, and the position maintaining mechanism prevents the power transfer mechanism from moving in the other one of the first direction and the second direction. Additional inventive features will become apparent from the description below, and such features alone or in combination with the above features may form the basis of further inventions as recited in the claims and their equivalents.

BRIEF DESCRIPTION OF THE DRAWINGS

FIGS. 4(A) and 4(B) together comprise an exploded view of the shift assist apparatus;

FIG. 6 is an oblique view of the outer cover of the shift assist apparatus;

FIG. 7(D) is a close-up view of the sub-pawl of the drive coupling mechanism when the shift assist apparatus moves to the activated state;

DETAILED DESCRIPTION OF THE EMBODIMENTS

Figure 1:
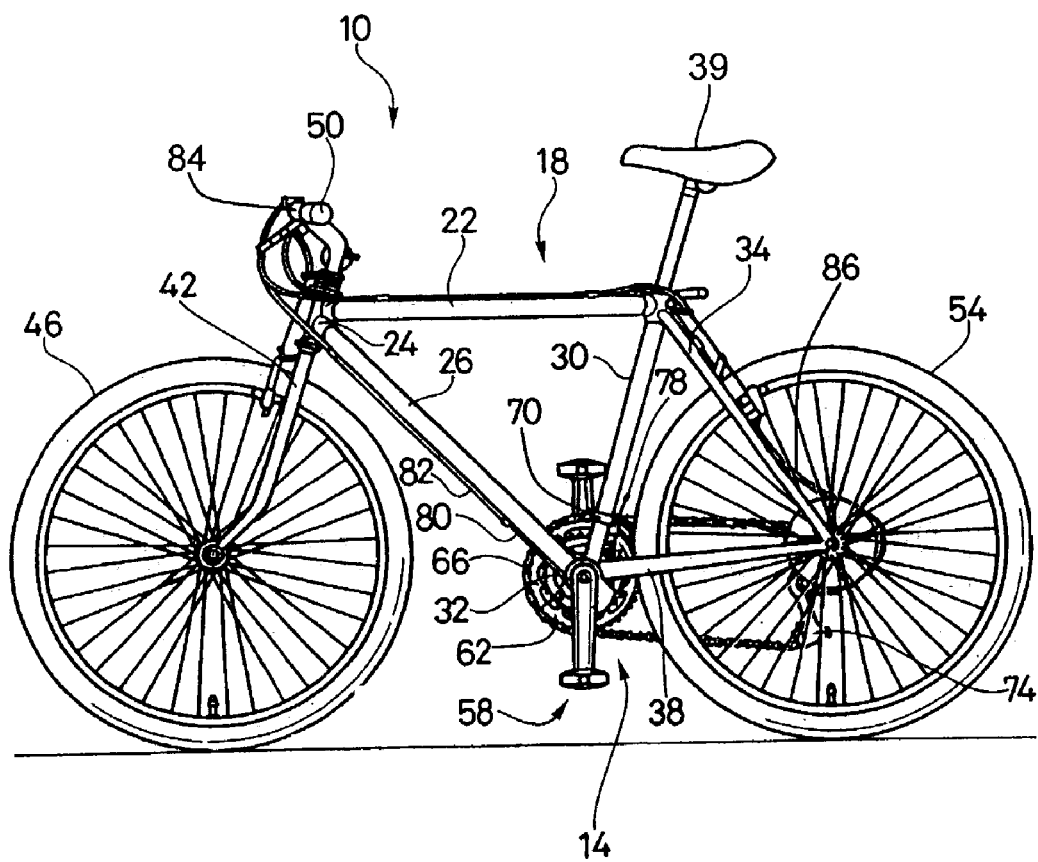
FIG. 1 is a side view of a particular embodiment of a bicycle that incorporates an apparatus according to the invention for assisting a speed change operation in a bicycle transmission.

FIG. 1 is a side view of a bicycle 10 that incorporates a particular embodiment of an apparatus 14 for assisting a change speed operation in a bicycle transmission. Bicycle 10 may be any type of bicycle, and in this embodiment bicycle 10 includes a typical frame 18 comprising a top tube 22, a head tube 24, a down tube 26 extending downwardly from head tube 24, a seat tube 30 extending downwardly from top tube 22, a bottom bracket 32 disposed at the junction of down tube 26 and seat tube 30, a pair of seatstays 34 extending rearwardly and downwardly from top tube 22, and a pair of chainstays 38 extending rearwardly from bottom bracket 32. A seat in the form of a saddle 39 is mounted to frame 18 at the junction of top tube 22 and seat tube 30. A fork 42 is rotatably supported within head tube 24, and a front wheel 46 is rotatably supported to the lower end of fork 42. The rotational direction of fork 42 and wheel 46 is controlled by a handlebar 50 in a well known manner. A rear wheel 54 having a plurality of coaxially mounted freewheel sprockets (not shown) is rotatably supported at the junction of seatstays 34 and chainstays 38, and a pedal assembly 58 supporting a plurality of front (chainwheel) sprockets 62 is rotatably supported within bottom bracket 32. In this embodiment, three front sprockets 62 rotate coaxially and integrally with pedal assembly 58. A chain 66 engages one of the plurality of front sprockets 62 and one of the plurality of freewheel sprockets mounted to rear wheel 54.

A front derailleur 70 moves chain 66 from one front sprocket 62 to another, and a rear derailleur 74 moves chain 66 from one freewheel sprocket to another. Both operations are well known. In this embodiment, front derailleur 70 is controlled by pulling and releasing an output control wire assembly 78 coupled to assist apparatus 14, and assist apparatus 14 is controlled by an electrical cable 82 connected to an electrically operated shift control device 84 mounted to the left side of handlebar 50. Shift control device 84 may comprise two electrical switches such as an upshift switch and a downshift switch (not shown), or some other appropriate control device. A Bowden-type control cable 86 controls rear derailleur 74, and control cable 86 may be controlled in a conventional manner or by an electrically operated mechanism.

Figure 2:
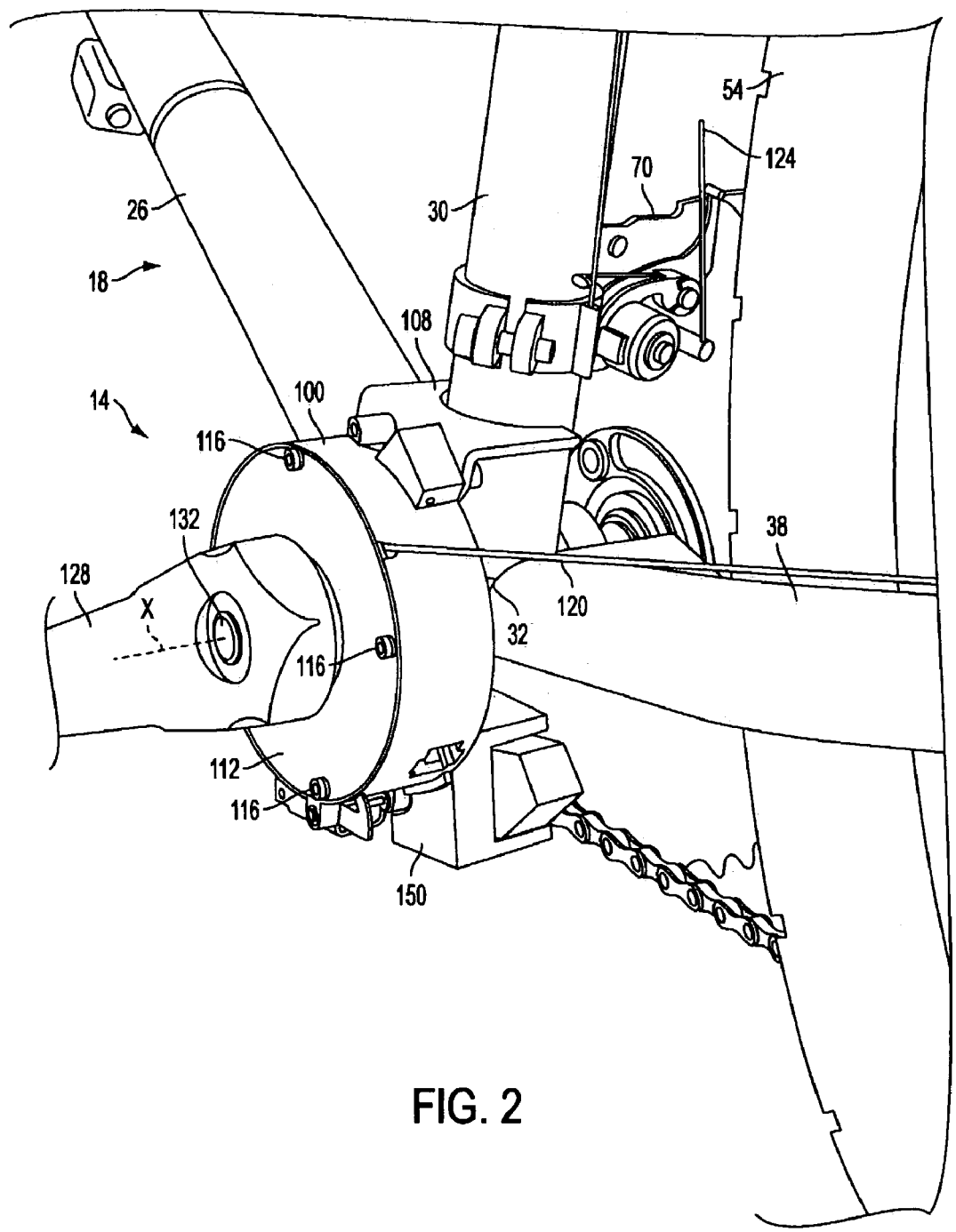
FIG. 2 is a closer view of the shift assist apparatus.

FIG. 2 is a closer view of shift assist apparatus 14. Shift assist apparatus 14 comprises a housing 100 attached to frame 18 by a tubular mounting member 300 (FIG. 4B) that screws into bottom bracket 32. Housing 100 is maintained in a stable and predetermined position relative to frame 18 by a positioning bracket 108 that engages seat tube 30, and an outer cover 112 is attached to housing 100 by screws 116 that screw into corresponding openings 354 (FIG. 5) in housing 100. In this embodiment, a first derailleur cable 120 of output control wire assembly 78 (FIG. 15) exits shift assist apparatus 14 and extends toward the rear of the bicycle, and a second derailleur cable 124 of output control wire assembly 78 is attached to front derailleur 70. A detailed description of output control wire assembly 78 will be provided below when discussing FIGS. 15–17. A crank arm 128 that forms a part of pedal assembly 58 is mounted to a crank axle 132 that extends through bottom bracket 32 for rotation around an axis X. A motor 150 connected to electrical cable 82 (FIG. 1) is provided for operating assist apparatus 14 in a manner described below.

Figure 3:
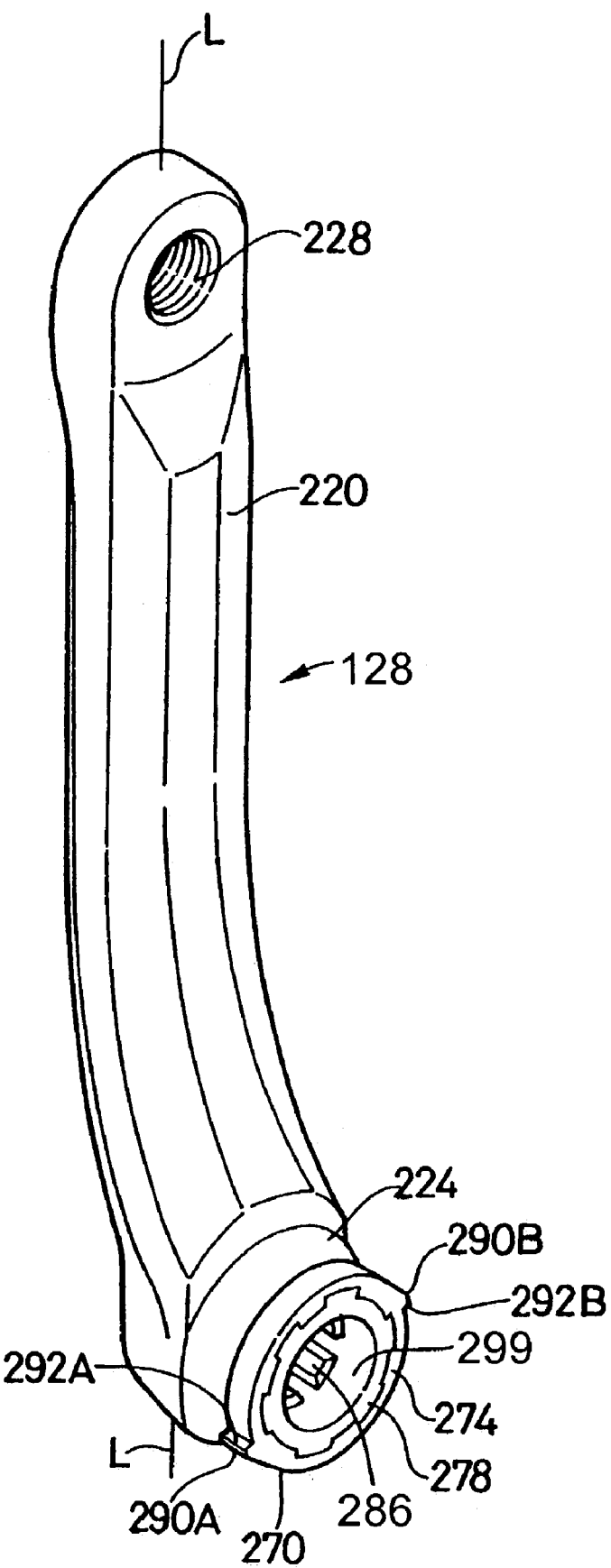
FIG. 3 is an oblique inner view of a particular embodiment of a pedal crank arm used with the shift assist apparatus.

FIG. 3 is an oblique inner view of a particular embodiment of crank arm 128. Crank arm 128 includes an elongated crank arm body 220, a crank axle mounting boss 224 at one end having an inner peripheral surface defining a crank axle mounting hole 299 and splines 286 for coupling to complementary splines on axle 132, and a threaded pedal mounting hole 228 on the other end. An annular drive ring 270 has a plurality of splines 274 formed on an inner peripheral surface thereof for nonrotatably engaging complementary splines 278 on the laterally innermost outer peripheral surface of crank axle mounting boss 224. The outer peripheral surface of drive ring 270 forms a pair of drive projections 290A and 290B, each having an abutment 292A and 292B, respectively, disposed 180° from each other and facing in the forward direction of rotation of crank arm 128. In other words, abutments 292A and 292B face in the clockwise direction in FIG. 3, and in the counterclockwise direction in FIG. 2. Abutments 292A and 292B follow an imaginary straight line extending radially outwardly from the axis of rotation X of pedal assembly 58 and perpendicular to the outer peripheral surface of crank axle mounting boss 224.

Figure 4B:
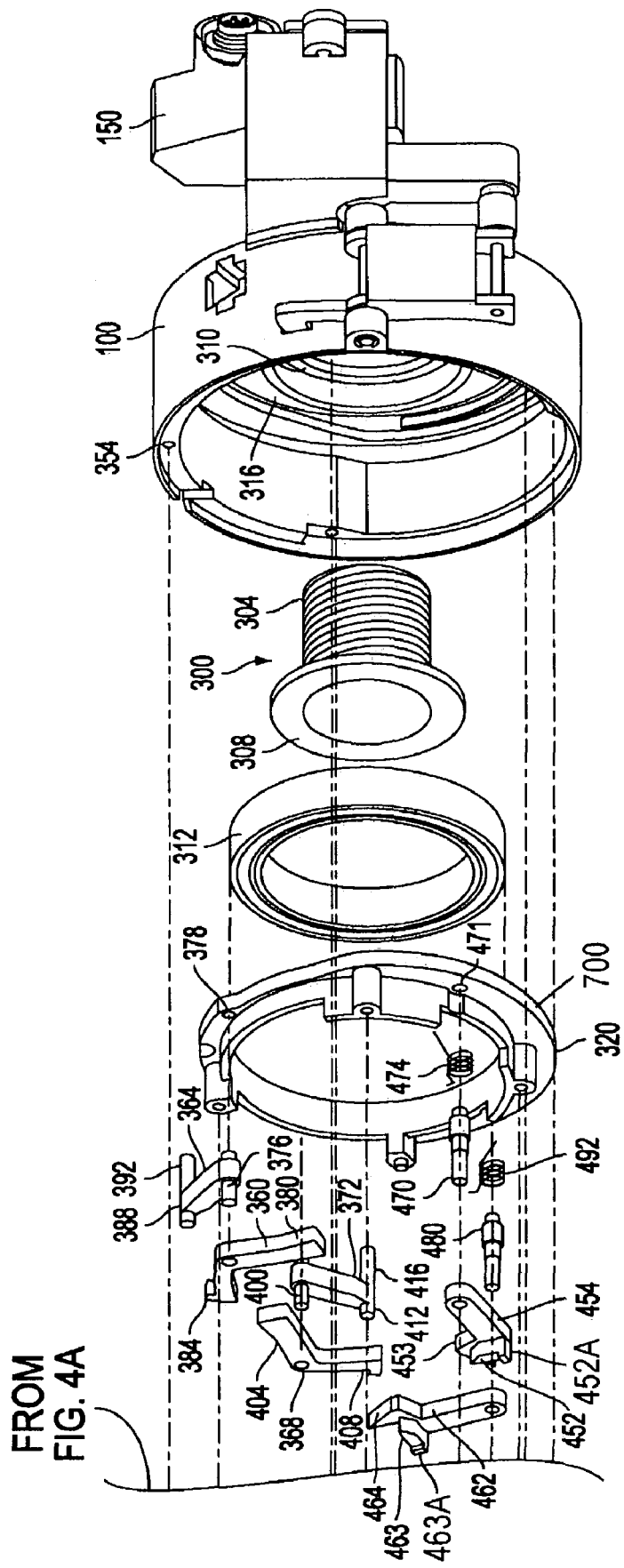
Figure 5:
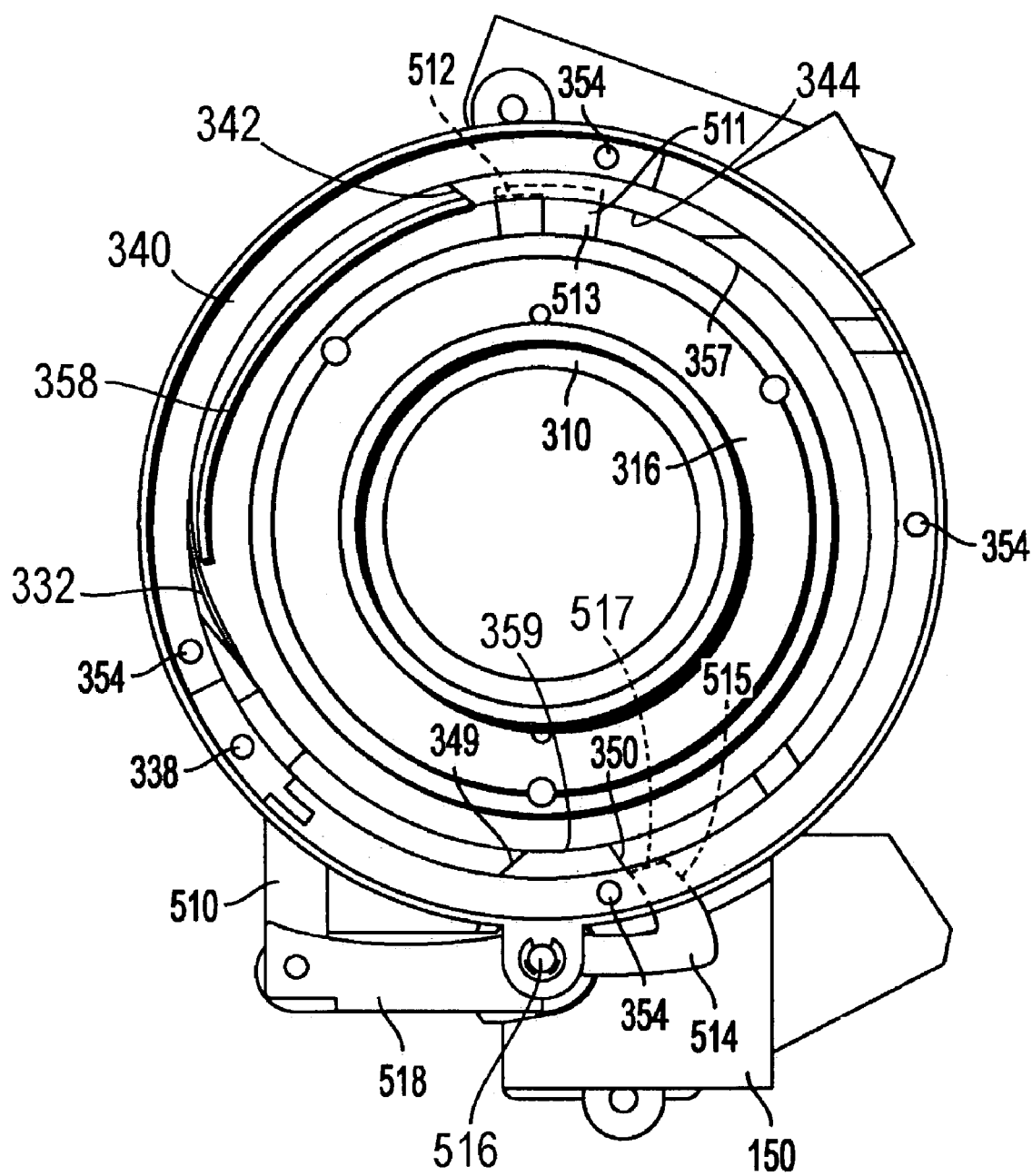
FIG. 5 is a view showing the interior of the housing for the shift assist apparatus.

FIGS. 4(A) and 4(B) together comprise an exploded view of shift assist apparatus 14, FIG. 5 is a view showing the interior of housing 100, and FIG. 6 is an oblique view of outer cover 112. The tubular mounting member 300 mentioned above has a threaded outer peripheral surface 304 and a flange 308, wherein threaded outer peripheral surface 304 screws into a complementary threaded inner peripheral surface (not shown) in bottom bracket 32, and flange 308 abuts against a mounting surface 310 of housing 100 to secure housing 100 to bottom bracket 32. A cartridge bearing 312 is fitted within a bearing seat 316 in housing 100 for rotatably supporting an annular lower pawl mounting member 320, wherein lower pawl mounting member 320 is attached to an annular upper pawl mounting member 324 through screws 328. An arcuate spring 332, which functions as a pawl decoupling member or ramp in a manner described below, is mounted to the inner peripheral surface of housing 100 through a spacer 335 and a screw 336 that screws into an opening 338 (FIG. 5) on the peripheral edge of housing 100. An arcuate pawl control member 340 having a positioning abutment 342, a pawl decoupling wall 344 and a pawl releasing notch 348 is mounted to a peripheral edge of housing 100 through a pair of the screws 116 that extend through outer cover 112, through openings 353 in pawl control member 340 and into a corresponding pair of the openings 354 on the peripheral edge of housing 100. As shown more clearly in FIG. 5, housing 100 also has a pawl decoupling wall 357, a pawl decoupling wall 358, a positioning ramp 349, a positioning abutment 350 and a pawl decoupling wall 359 that function in a manner discussed below.

An annular cable coupling plate 355 having a cable coupling opening 356 is mounted to upper pawl mounting member 324 though a key opening 361 so that cable coupling plate 355 can pull and release first derailleur cable 120 upon movement of upper pawl mounting member 324. As shown in FIGS. 4(A) and 6, outer cover 112 includes a plate portion 500 and a cylindrical portion 504 with a cutout 508 (FIG. 6) defining an intermediate position maintaining abutment 509 that function in a manner described below.

Drive pawl assemblies comprising drive sub-pawls 360, 364 and drive sub-pawls 368, 372 are pivotably mounted to lower pawl mounting member 320 so as to be sandwiched between lower pawl mounting member 320 and upper pawl mounting member 324. More specifically, drive sub-pawl 360 is pivotably mounted to a pivot shaft 376 on drive sub-pawl 364, and pivot shaft 376 is further pivotably mounted to an opening 378 in lower pawl mounting member 320 so that both sub-pawls 360 and 364 are pivotably mounted to lower pawl mounting member 320. Drive sub-pawl 360 includes a movable member engaging portion 380 and a pawl control portion 384. Movable member engaging portion 380 is provided for engaging one of the abutments 292A or 292B on crank arm 128, and pawl control portion 384 is provided for engaging a pawl control portion 388 on drive sub-pawl 364. Drive sub-pawl 360 is biased in the clockwise direction by a spring 389 mounted to upper pawl mounting member 324 through a screw 390. More specifically, a spring arm 391 of spring 389 extends through an opening 393 (FIG. 7(A)) in upper pawl mounting member 324 and contacts movable member engaging portion 380 of drive sub-pawl 360. As a result, pawl control portion 384 of drive sub-pawl 360 is biased against the pawl control portion 388 on drive sub-pawl 364, so both drive sub-pawl 360 and drive sub-pawl 364 are biased in the clockwise direction. Pawl control portion 388 on drive sub-pawl 364 includes a control pin 392 that functions in a manner described below.

Similarly, drive sub-pawl 368 is pivotably mounted to a pivot shaft 400 on drive sub-pawl 372, and pivot shaft 400 is further pivotably mounted to an opening (not shown) in lower pawl mounting member 320 so that both drive sub-pawls 368 and 372 are pivotably mounted to lower pawl mounting member 320. Drive sub-pawl 368 includes a movable member engaging portion 404 and a pawl control portion 408. Movable member engaging portion 404 is provided for engaging one of the abutments 292A or 292B on crank arm 128, and pawl control portion 408 is provided for engaging a pawl control portion 412 on drive sub-pawl 372. Drive sub-pawl 368 is biased in the clockwise direction by a spring 420 mounted to upper pawl mounting member 324 through a screw 428. More specifically, a spring arm 424 of spring 420 extends through an opening 430 (FIG. 7(A)) in upper pawl mounting member 324 and contacts movable member engaging portion 404 of drive sub-pawl 368. As a result, pawl control portion 408 of drive sub-pawl 368 is biased against the pawl control portion 412 on drive sub-pawl 372, so both drive sub-pawl 368 and drive sub-pawl 372 are biased in the clockwise direction. Pawl control portion 412 on drive sub-pawl 372 includes a control pin 416 that functions in a manner described below.

Position maintaining pawl assemblies comprising main position maintaining sub-pawls 450, 458 and auxiliary position maintaining sub-pawls 454, 462 are pivotably mounted so as to sandwich upper pawl mounting member 324. More specifically, a pivot shaft 470 is mounted to an opening 471 in lower pawl mounting member 320, pivotably supports auxiliary position maintaining sub-pawl 454 on the right side of upper pawl mounting member 324, extends through an opening 472 in upper pawl mounting member 324, and pivotably supports main position maintaining sub-pawl 450 on the left side of upper pawl mounting member 324. Auxiliary position maintaining sub-pawl 454 includes a moving member engaging portion 453 and an intermediate position maintaining portion 452 defining a main position maintaining sub-pawl contact ledge 452a on the bottom thereof. Main position maintaining sub-pawl 450 includes a position maintaining tooth 456 and a partial slot 455 that forms an abutment 455a for contacting main position maintaining sub-pawl contact ledge 452a. A spring leg 488 of a spring 490 that is mounted to upper pawl mounting member 324 by a screw 491 biases main position maintaining sub-pawl 450 counterclockwise (radially outward). Auxiliary position maintaining sub-pawl 454 is biased in a clockwise (radially inward) direction by a spring 474 mounted around pivot shaft 470. However, auxiliary position maintaining sub-pawl 454 ordinarily is held radially outward by the contact between ledge 452a and abutment 455a because the spring force of spring 490 is greater than the spring force of spring 474.

Similarly, a pivot shaft 480 is mounted to an opening (not shown) in lower pawl mounting member 320, pivotably supports auxiliary position maintaining sub-pawl 462 on the right side of upper pawl mounting member 324, extends through an opening 484 in upper pawl mounting member 324, and pivotably supports main position maintaining sub-pawl 458 on the left side of upper pawl mounting member 324. Auxiliary position maintaining sub-pawl 462 includes a moving member engaging portion 464 and an intermediate position maintaining portion 463 defining a main position maintaining sub-pawl contact ledge 463a on the bottom thereof. Main position maintaining sub-pawl 458 includes a position maintaining tooth 466 and a partial slot 465 that forms an abutment 465a for contacting main position maintaining sub-pawl contact ledge 463a. A spring leg 489 of spring 490 biases main position maintaining sub-pawl 458 counterclockwise (radially outward). Auxiliary position maintaining sub-pawl 462 is biased in a clockwise (radially inward) direction by a spring 492 mounted around pivot shaft 480. However, auxiliary position maintaining sub-pawl 462 ordinarily is held radially outward by the contact between ledge 463a and abutment 465a because the spring force of spring 490 is greater than the spring force of spring 492. Coupling lower pawl mounting member 320, upper pawl mounting member 324, main position maintaining sub-pawls 450, 458, auxiliary position maintaining sub-pawls 454, 462 and drive sub-pawls 360, 364, 368, 372 together in this manner allows these components to be removed as a unit from assist apparatus 14 for ease of assembly and repair.

Figure 7A:
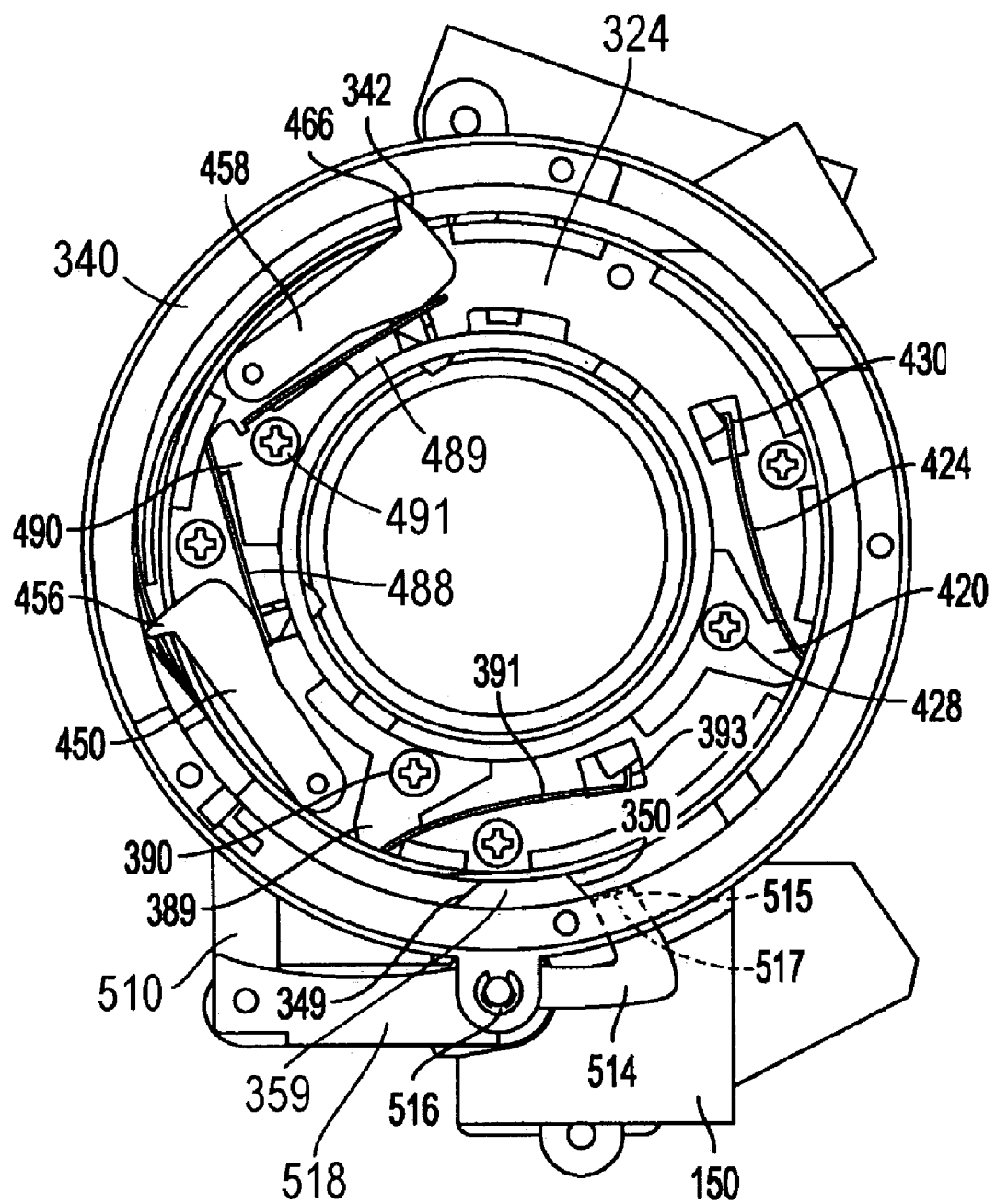
FIG. 7(A) is a view of the main position maintaining sub-pawls of the position maintaining mechanism when the shift assist apparatus is in an initial position.
Figure 7B:
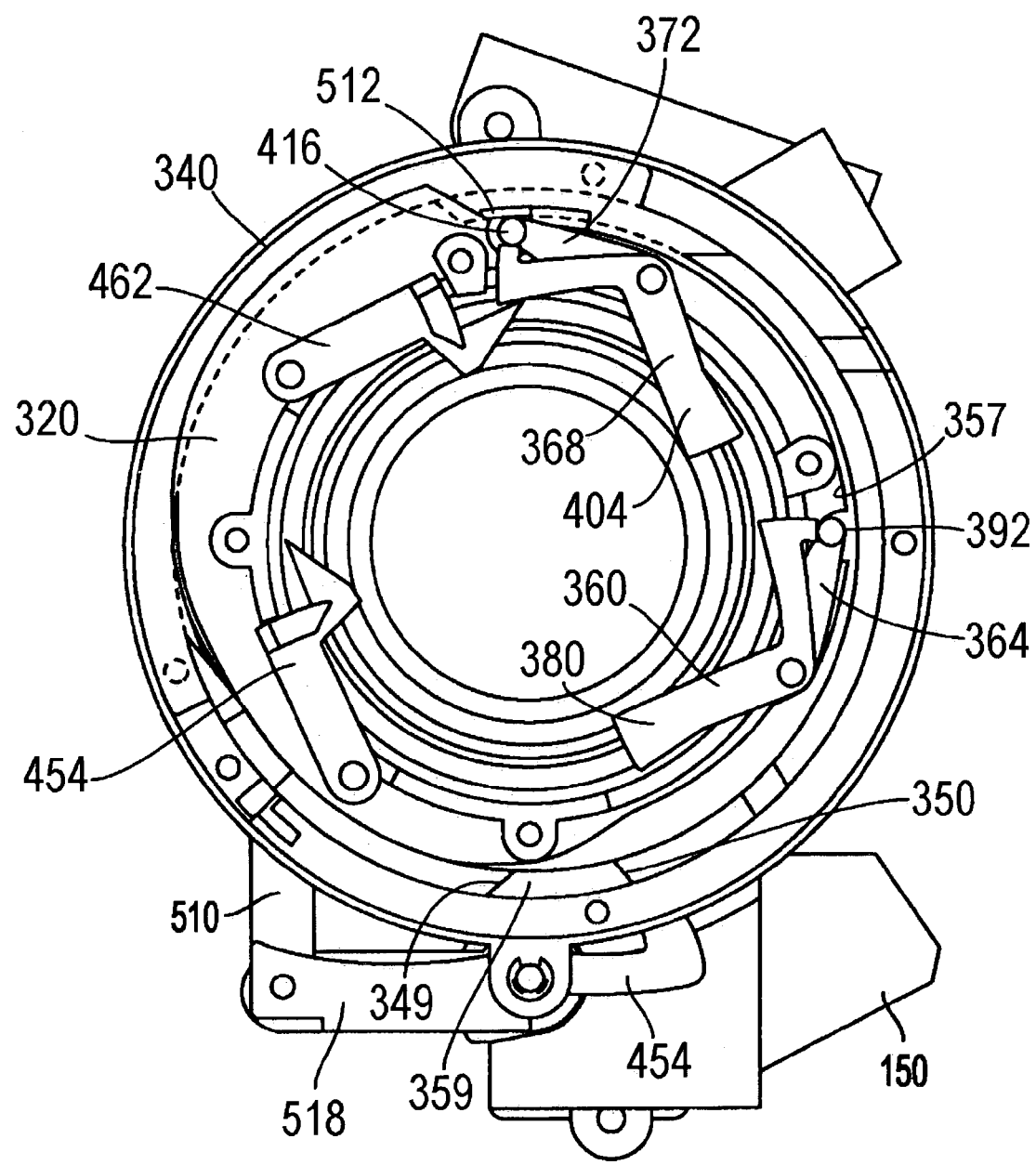
FIG. 7(B) is a view of the sub-pawls of the drive coupling mechanism when the shift assist apparatus in an inactivated state and in the initial position.
Figure 7C:
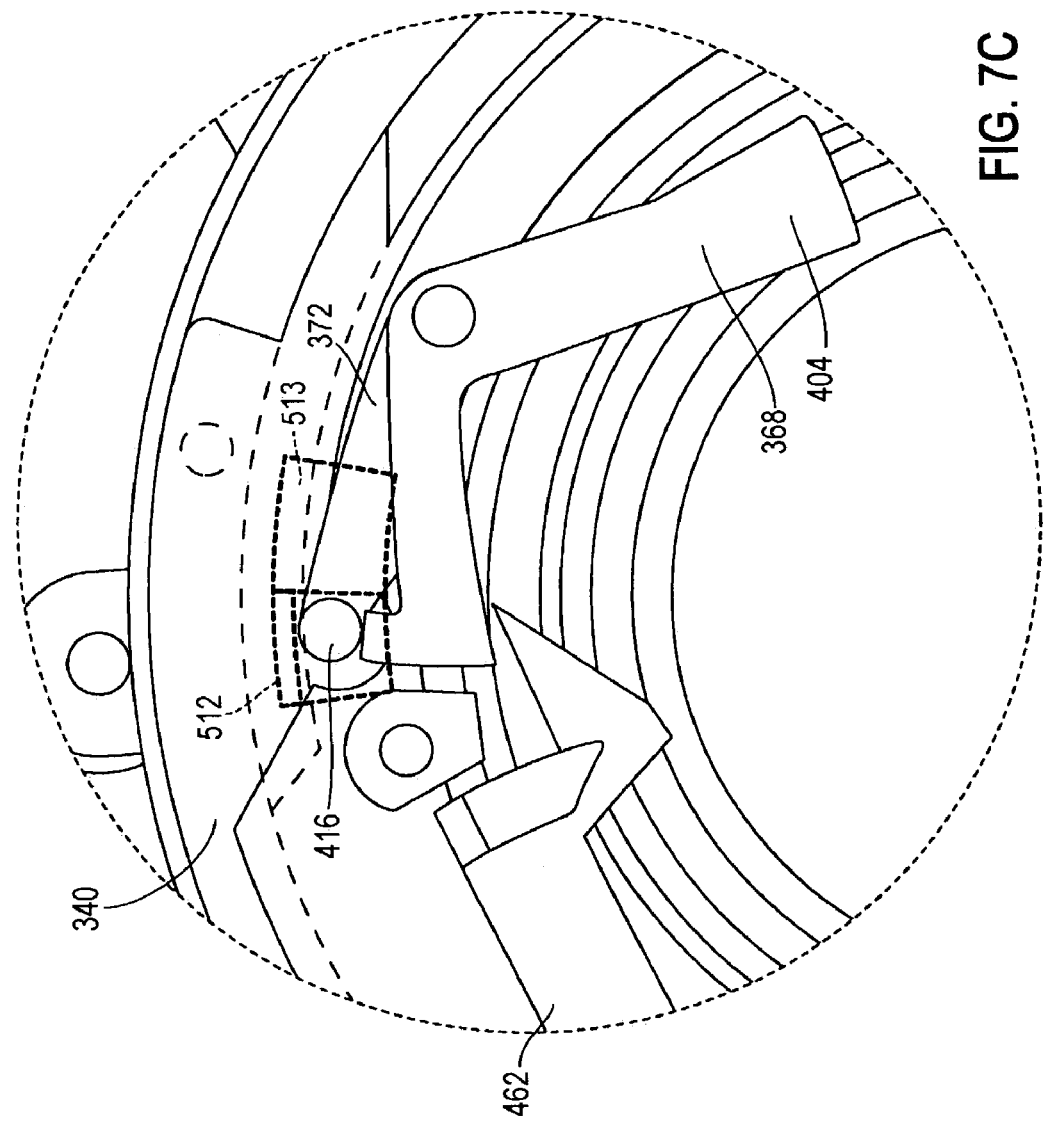
FIG. 7(C) is a close-up view of a sub-pawl of the drive coupling mechanism when the shift assist apparatus in the inactivated state and in the initial position.

As shown in FIGS. 5, 7(C) and 7(D), motor 150 includes a drive control link 510 pivotably mounted to a drive control arm 518 which, in turn, is pivotably mounted to a pivot shaft 516. Drive control link 510 is coupled to a drive control ring 511 concentrically and rotatably mounted in housing 100 (only a very small section of drive control ring 511 is shown in the drawings). Drive control ring 511 has a movable drive control abutment 512 that extends through a drive control opening 513 in housing 100. When drive control abutment 512 is in the position shown in FIGS. 5 and 7(C), then motor 150 can rotate drive control ring 511 in a clockwise direction via drive control link 510 and drive control arm 518 so that drive control abutment 512 moves to the right edge of drive control opening 513 as shown in FIG. 7(D). Similarly, when drive control abutment 512 is at the right edge of drive control opening 513, motor 150 can rotate drive control ring 511 counterclockwise via drive control link 510 and drive control arm 518 so that drive control abutment 512 returns to the left edge of drive control opening 513. Motor 150 also operates a release control pawl 514 with a release control abutment 517 that extends through an opening 515 during a pawl release operation discussed below.

FIG. 7(A) is a view of the main position maintaining sub-pawls 450 and 458 of the position maintaining mechanism when assist apparatus 14 is in an initial position, and FIG. 7(B) is a view of the auxiliary position maintaining sub-pawls 454 and 462 of the position maintaining mechanism and the drive sub-pawls 360, 364 and 368, 372 of the drive coupling mechanism when shift apparatus 14 is in an inactivated state and in the initial position. If front derailleur 70 is of the type wherein pulling output control wire assembly 78 causes front derailleur 70 to move chain 66 from a smaller diameter (lower speed) sprocket to a larger diameter (higher speed) sprocket, then FIG. 7(A) represents assist apparatus 14 in a low speed position. In this position, position maintaining tooth 466 of main position maintaining sub-pawl 458 abuts against positioning abutment 342 of pawl control member 340; position maintaining tooth 456 of main position maintaining sub-pawl 450 is in an idle position; control pin 416 of drive sub-pawl 372 is held radially inwardly against the biasing force of spring 420 by drive control abutment 512; and control pin 392 of drive sub-pawl 364 is held radially inwardly against the biasing force of spring 389 by drive control abutment 357 of housing 100. This positioning of drive sub pawls 360, 364 and 368, 372 ensure that the moving member engaging portions 380 and 404 of drive sub-pawls 360 and 368, respectively, are held radially inwardly so that neither moving member engaging portion 380 nor moving member engaging portion 404 can contact either of the abutments 292A, 292B on crank arm 128.

Figure 7E:
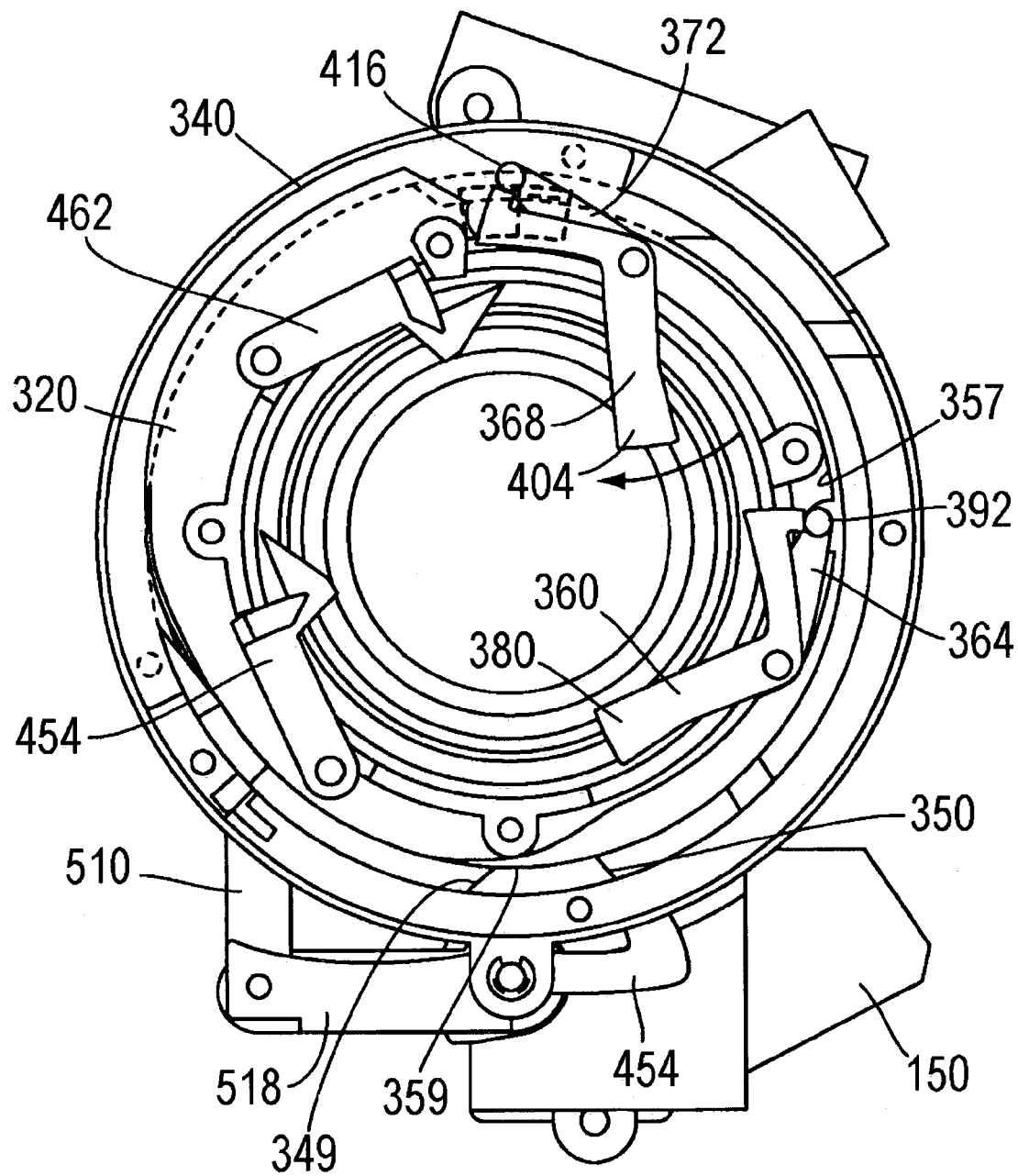
FIG. 7(E) is an overall view of the sub-pawls of the drive coupling mechanism when the shift assist apparatus in the activated state.

FIGS. 7(C)–7(E) illustrate the operation of drive sub-pawls 360,364 and 368,372 when switching from an inactivated state to an activated state. When the rider provides an upshift command using shift control device 84, then motor 150 moves drive control link 510 and drive control arm 518 so that drive control abutment 512 moves from the position shown in FIG. 7(C) to the right edge of drive control opening 513 as shown in FIG. 7(D). At that time, drive sub-pawl 372 rotates clockwise, and control pin 416 moves radially outwardly into pawl releasing notch 348 of pawl control member 340 in accordance with the biasing force of spring 420. Drive sub-pawl 368 also rotates clockwise as shown in FIGS. 7(D) and 7(E), and movable member engaging portion 404 of drive sub-pawl 368 moves radially inwardly. In this position, movable member engaging portion 404 of drive sub-pawl 368 will engage one of the abutments 292A or 292B on crank arm 128 when crank arm 128 is in the proper rotational position. When that happens, the rotational force of crank arm 128 is communicated to lower pawl mounting member 320 and upper pawl mounting member 328 through drive sub-pawl 368. Accordingly, main position maintaining sub-pawls 450 and 458 and drive sub-pawls 360,364 and 368,372 rotate counterclockwise together.

Figure 7F:
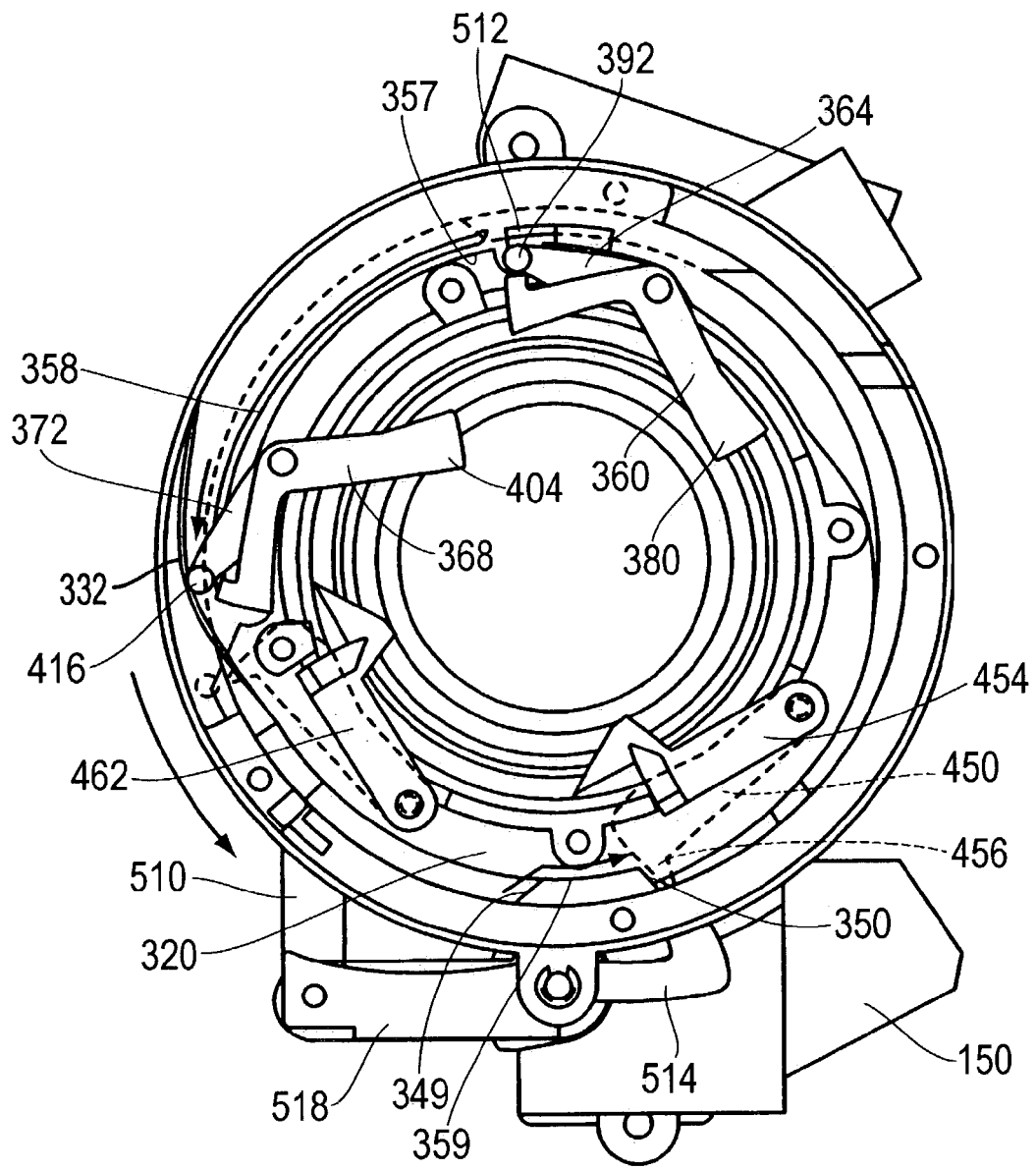
FIG. 7(F) is a view of the shift assist apparatus just before the drive coupling mechanism disengages from the pedal crank arm.

As lower pawl mounting member 320 and upper pawl mounting member 324 rotate counterclockwise, position maintaining tooth 456 of main position maintaining sub-pawl 450 slides up positioning ramp 349, across pawl decoupling wall 359, and slightly beyond positioning abutment 350 as shown in FIG. 7(F). Control pin 392 of drive sub-pawl 364, which was held radially inwardly by pawl decoupling wall 357, moves to a position beneath drive control abutment 512 and remains held radially inwardly. At the same time, control pin 416 of drive sub-pawl 372 slides along the radially inner surface of arcuate spring 332 and is pushed radially inwardly. When control pin 416 of drive sub-pawl 372 moves radially inwardly, drive sub-pawl 368 rotates counterclockwise, and moving member engaging portion 404 of drive sub-pawl 368 eventually disengages from the engaged abutment 292A or 292B of crank arm 118.

The timing of when drive sub-pawl 368 disengages from the engaged abutment 292A or 292B depends on the strength of arcuate spring 332. More specifically, as shown in FIG. 7(F), control pin 416 resists the radially inward force of arcuate spring 332 as a result of the engaging force between drive sub-pawl 368 and the engaged abutment 292A or 292B, so arcuate spring 332 initially is deformed radially outwardly. Eventually, however, the spring force and radially inward path of arcuate spring 332 overcome this engaging force, and drive sub-pawl 368 disengages from the engaged abutment 292A or 292B. If arcuate spring 332 is weak, then drive sub-pawl 368 will remain engaged with the engaged abutment 292A or 292B longer, and position maintaining tooth 456 of main position maintaining sub-pawl 450 will move further beyond positioning abutment 350, than if arcuate spring 332 were strong.

Figure 7G:
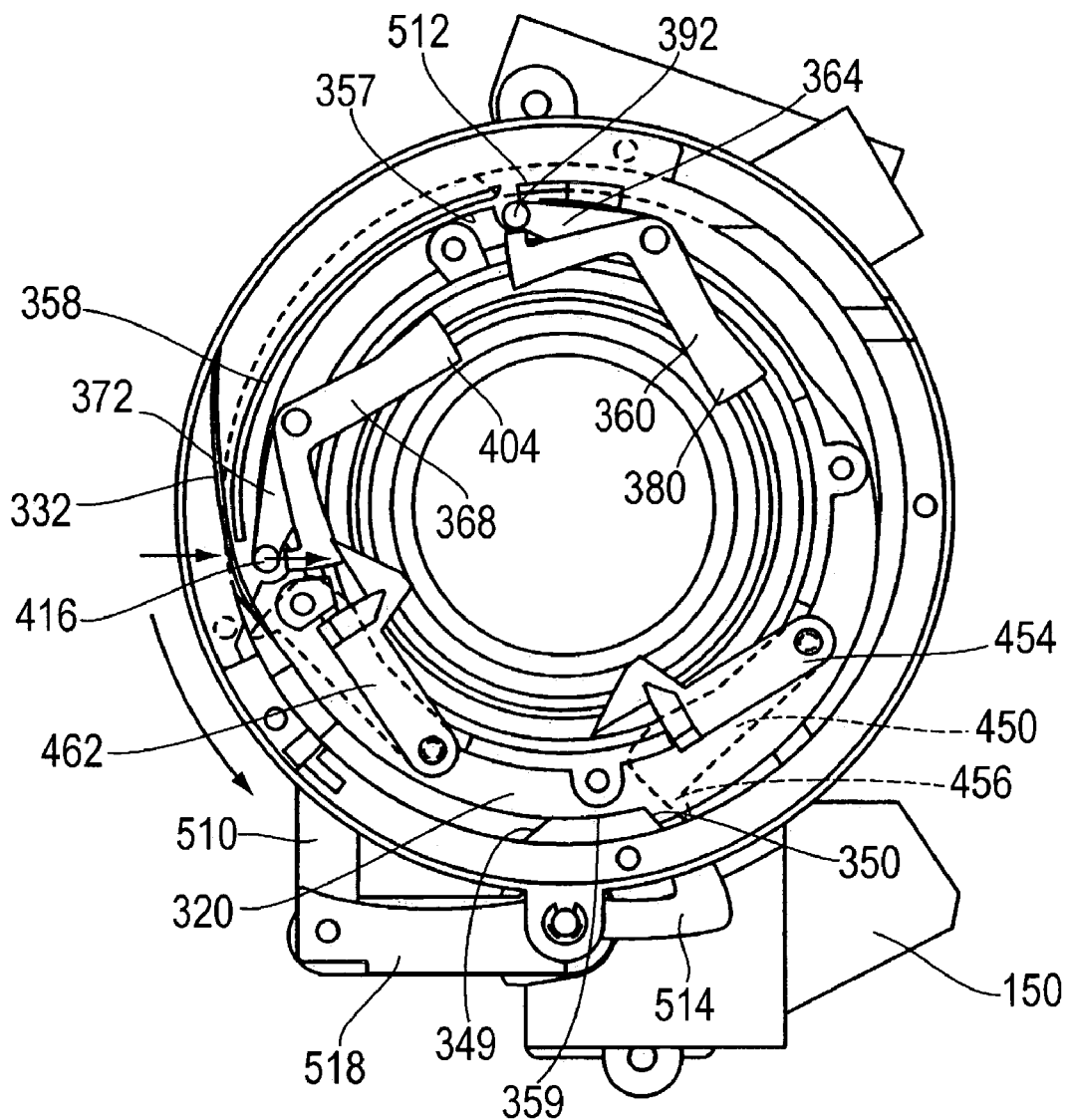
FIG. 7(G) is a view of the shift assist apparatus when the drive coupling mechanism disengages from the pedal crank arm.
Figure 8A:
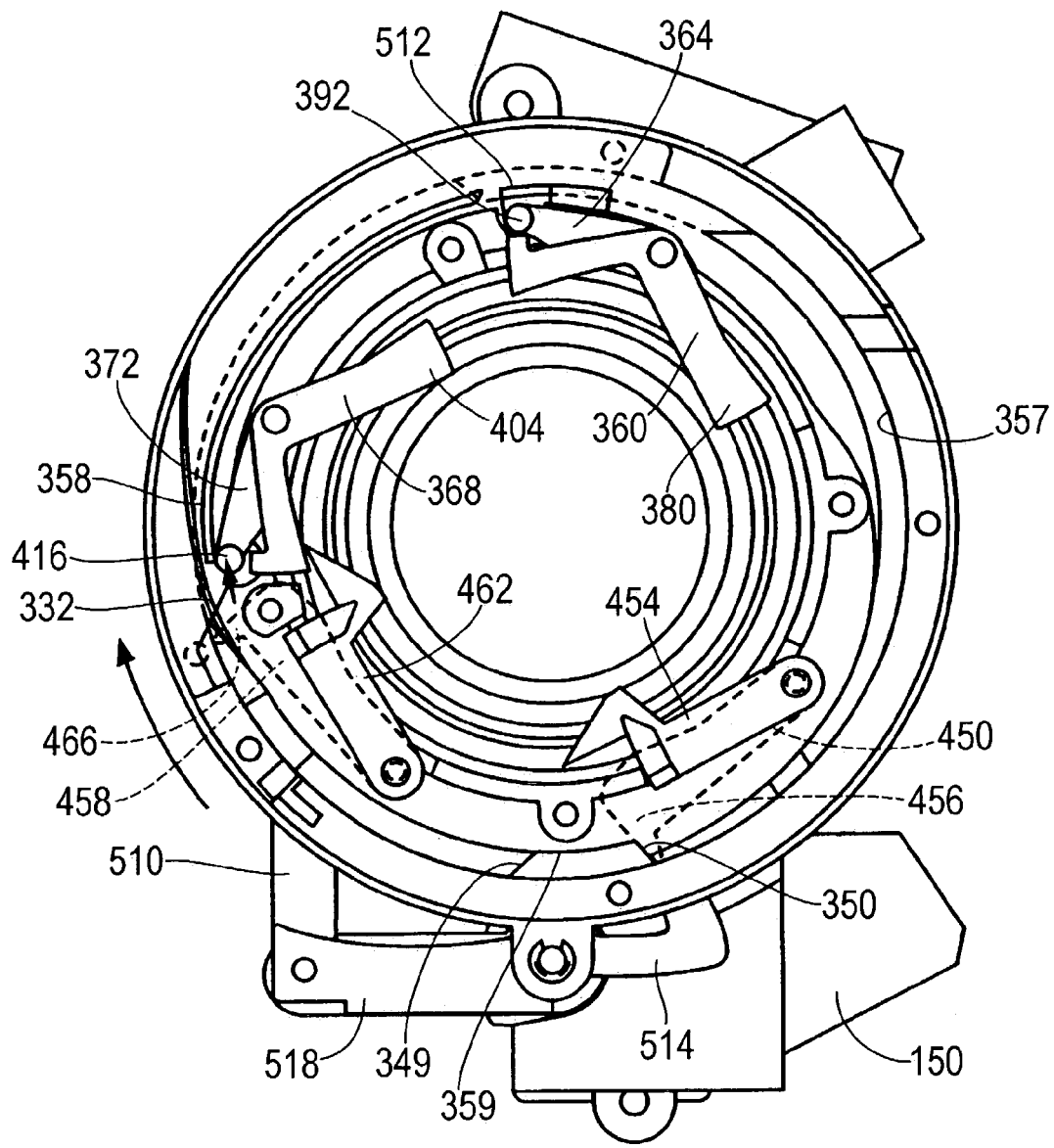
FIG. 8(A) is a view of the sub-pawls of the drive coupling mechanism when the shift assist apparatus returns to an inactivated state in an intermediate position.
Figure 8B:
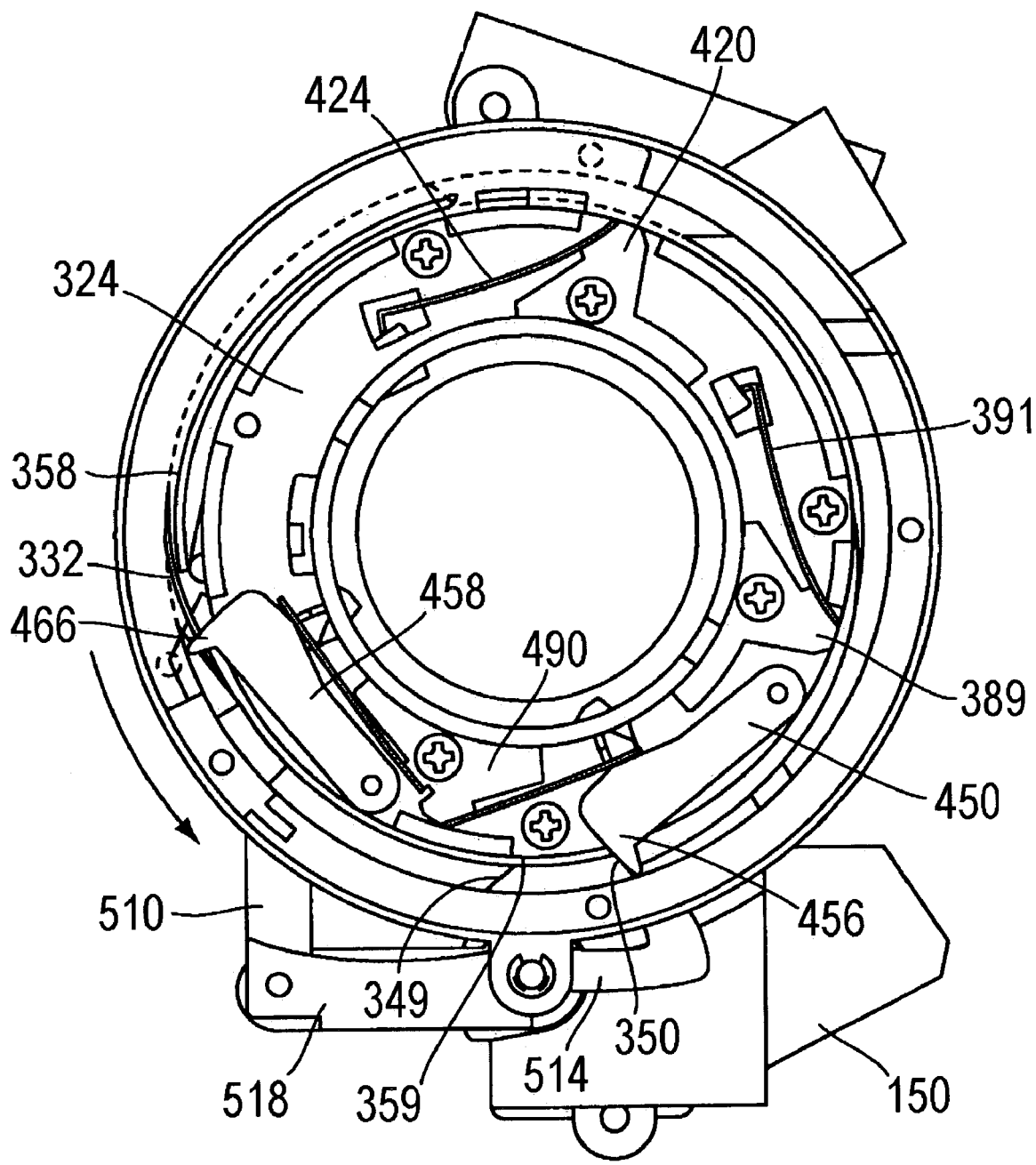
FIG. 8(B) is a view of the main position maintaining sub-pawls of the position maintaining mechanism when the shift assist apparatus is in the intermediate position.

When drive sub-pawl 368 disengages from the engaged abutment 292A or 292B, arcuate spring 332 pushes control pin 416 further radially inwardly as shown in FIG. 7(G) and closes the space between arcuate spring 332 and pawl decoupling wall 358. At the same time, lower pawl mounting member 320 and upper pawl mounting member 324 rotate slightly clockwise as a result of the biasing force of the return spring in front derailleur 70. Control pin 416 of drive sub-pawl 372 moves to a position radially inwardly of pawl decoupling wall 358 as shown in FIGS. 8(A) and 8(B), and position maintaining tooth 456 of main position maintaining sub-pawl 450 moves to a position abutting against positioning abutment 350. The net result is that output control wire assembly 78 causes front derailleur 70 to move chain 66 temporarily beyond the destination sprocket and then return chain 66 to a position aligned with the destination sprocket. This overshift phenomenon is well known and facilitates shifting a chain from a smaller diameter sprocket to a larger diameter sprocket. It should be readily apparent that the amount of overshifting may be adjusted by selecting an appropriate strength of arcuate spring 332.

Figure 9A:
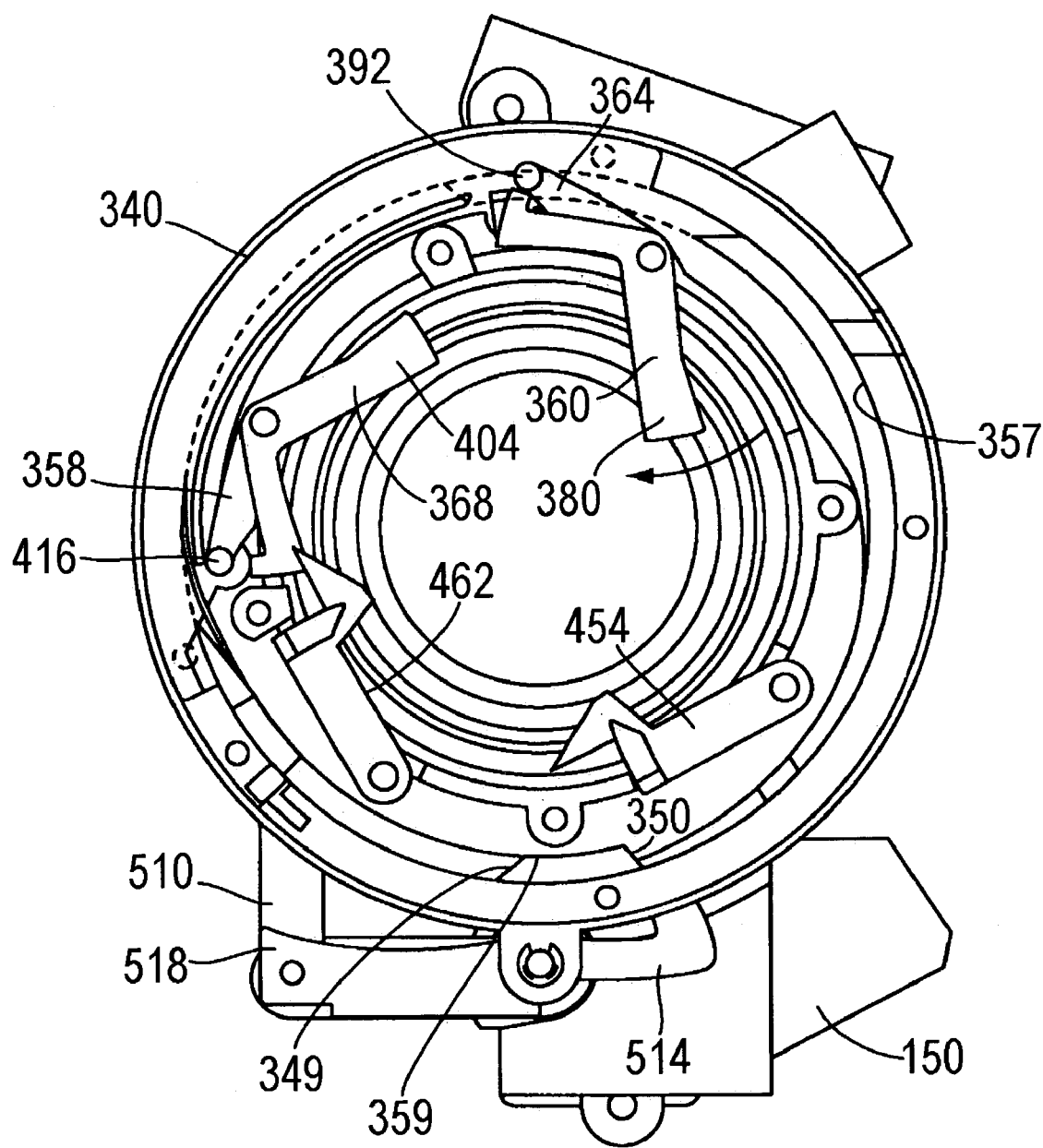
FIG. 9 (A) is a view of the sub-pawls of the drive coupling mechanism when the shift assist apparatus in an activated state and in the intermediate position.
FIG. 9(B) is a view of the sub-pawls of the drive coupling mechanism when the shift assist apparatus returns to an inactivated state in the final position.
FIG. 9(C) is a view of the main position maintaining sub-pawls when the shift assist apparatus is in a final position.

When the rider provides another upshift command using shift control device 84, then motor 150 again moves drive control link 510 and drive control arm 518 so that drive control abutment 512 moves to the right edge of drive control opening 513. At that time, drive sub-pawl 364 rotates clockwise as shown in FIG. 9(A), and control pin 392 moves radially outwardly into pawl releasing notch 348 of pawl control member 340 in accordance with the biasing force of spring 389. Drive sub-pawl 360 also rotates clockwise, and movable member engaging portion 380 of drive sub-pawl 360 moves radially inwardly. In this position, movable member engaging portion 380 of drive sub-pawl 360 will engage one of the abutments 292A or 292B on crank arm 128 when crank arm 128 is in the proper rotational position. When that happens, the rotational force of crank arm 128 is communicated to lower pawl mounting member 320 and upper pawl mounting member 324 through drive sub-pawl 360. Accordingly, main position maintaining sub-pawls 450 and 458 and drive sub-pawls 360,364 and 368,372 rotate counterclockwise together.

Figure 9B:
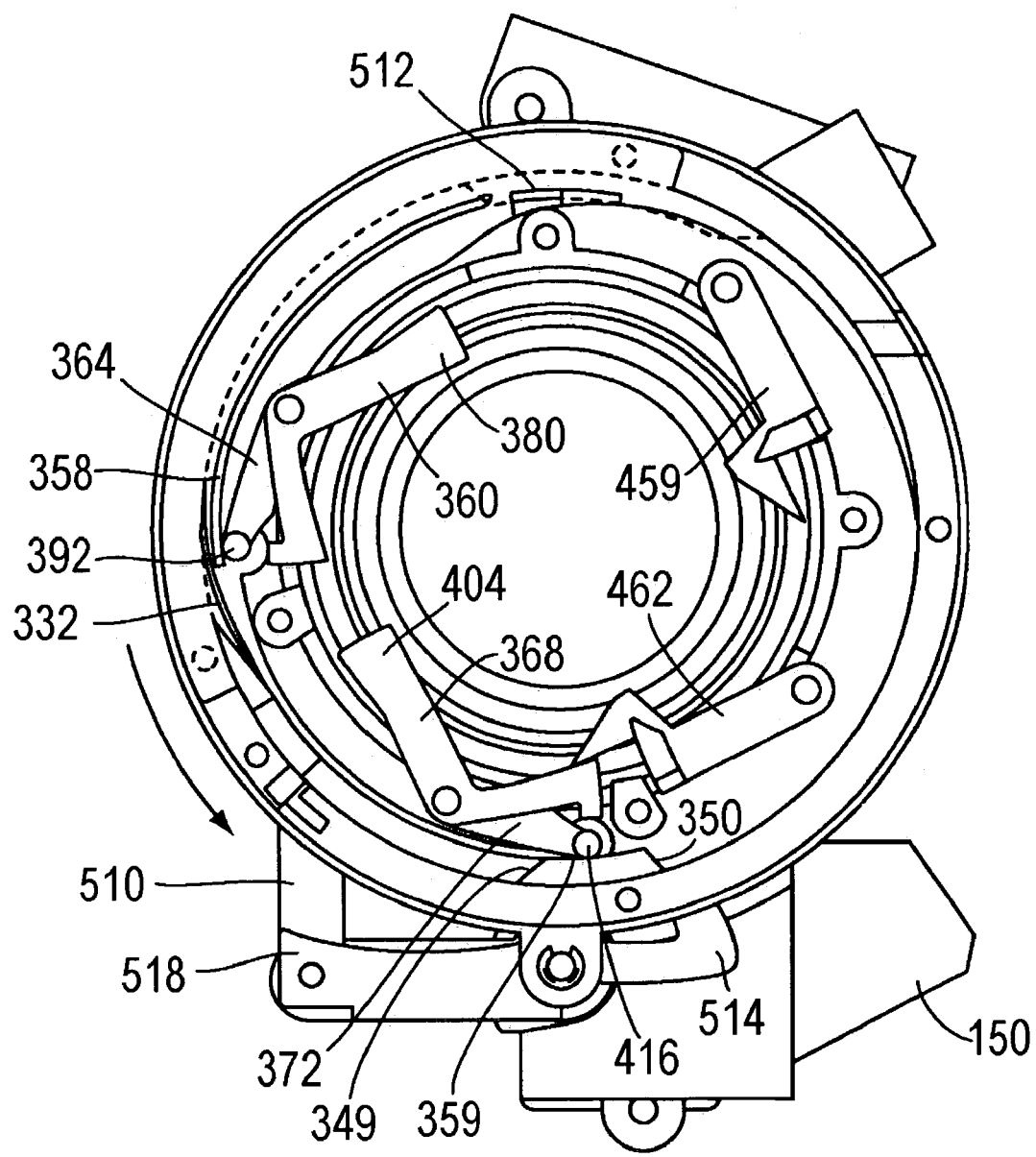

When drive sub-pawls 360,364 and 368,372 rotate toward the position shown in FIG. 9(B), control pin 416 of drive sub-pawl 372, which was held radially inwardly by pawl decoupling wall 358, moves to the position radially inwardly of pawl decoupling wall 359 and remains held radially inwardly. Also, control pin 392 of drive sub-pawl 364 slides along arcuate spring 332 and is pushed radially inwardlyl 18 in the same manner discussed above for drive sub-pawl 372. At the same time, position maintaining tooth 466 of main position maintaining sub-pawl 458 slides up positioning ramp 349, across pawl decoupling wall 359, and slightly beyond positioning abutment 350 to produce the overshift effect.

Figure 9C:
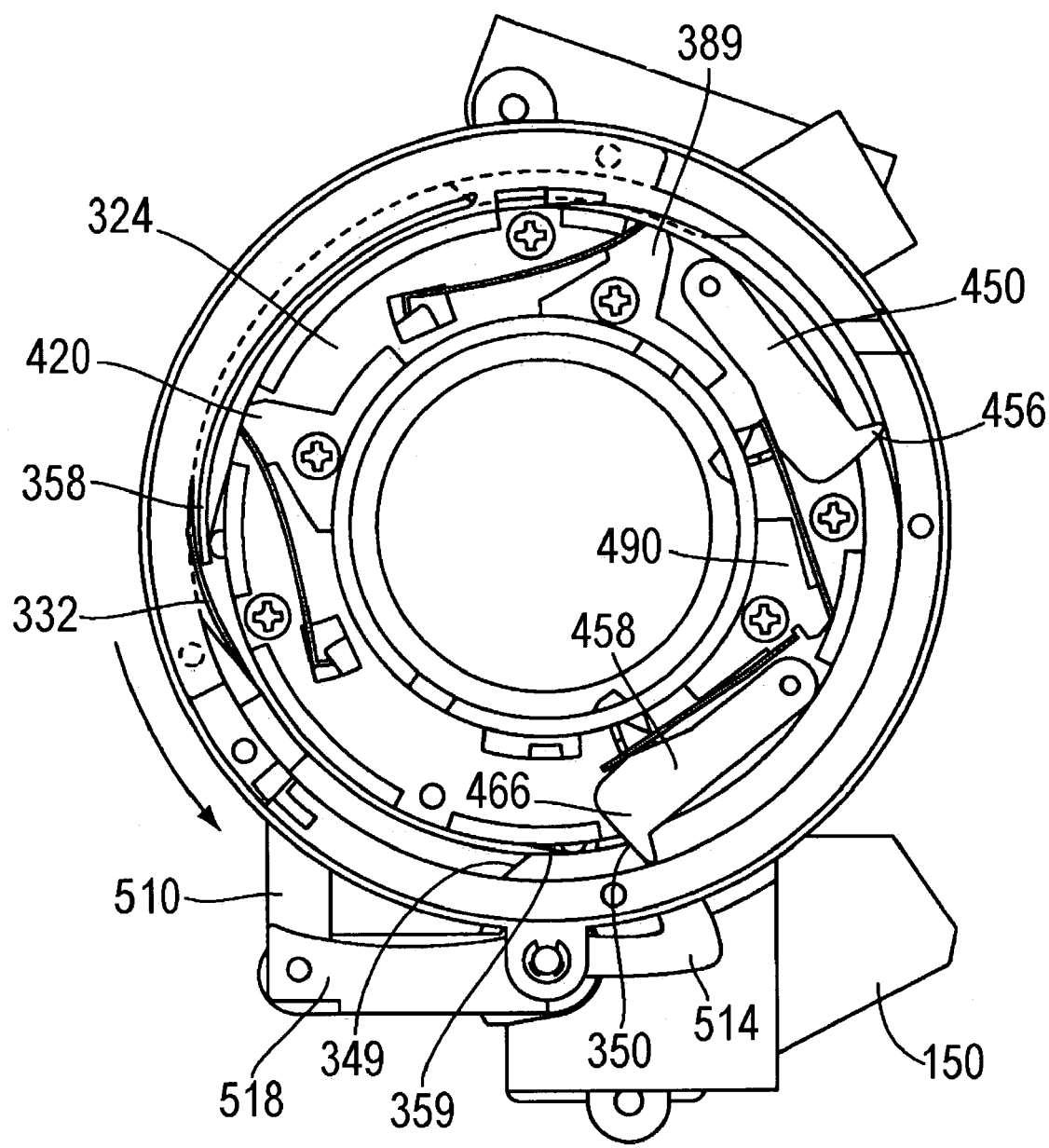

When control pin 392 of drive sub-pawl 364 moves radially inwardly, drive sub-pawl 364 rotates counterclockwise, and moving member engaging portion 380 of drive sub-pawl 364 eventually disengages from the engaged abutment 292A or 292B of crank arm in the same manner discussed above for drive sub-pawl 372. When that happens, lower pawl mounting member 320 and upper pawl mounting member 324 rotate slightly clockwise as a result of the biasing force of the return spring in front derailleur 70. Then, control pin 392 of drive sub-pawl 364 moves radially inwardly of pawl decoupling wall 358 as shown in FIG. 9(B), and position maintaining tooth 466 of main position maintaining sub-pawl 458 abuts against positioning abutment 350 as shown in FIG. 9(C). Assist apparatus 14, and output control wire assembly 78 is in the high speed position at that time.

Figure 10:
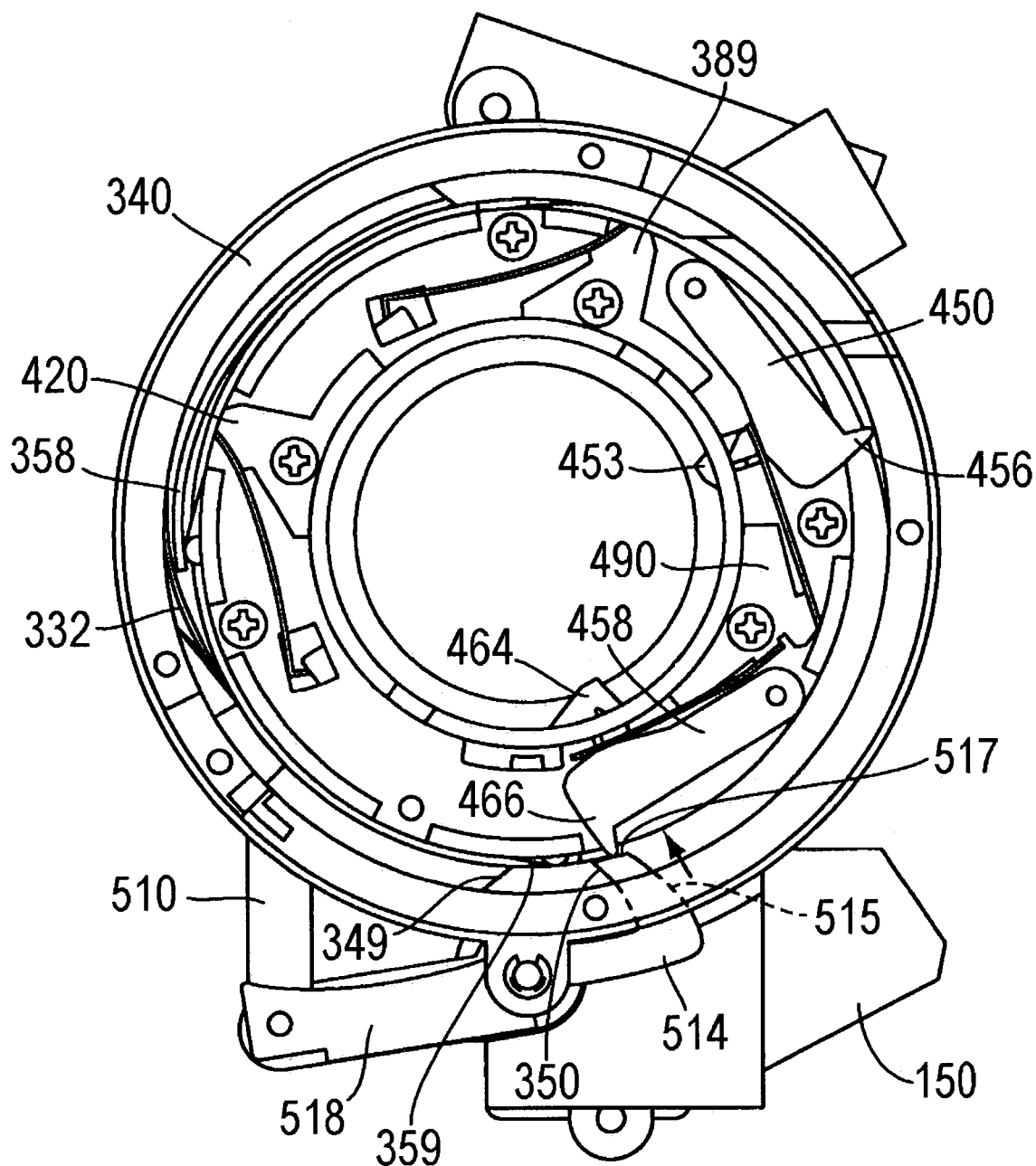
FIG. 10 is a view of the sub-pawls of the position maintaining mechanism when the leftmost main position maintaining sub-pawl is disengaged to allow the power transfer mechanism to move toward the intermediate position.
Figure 11A:
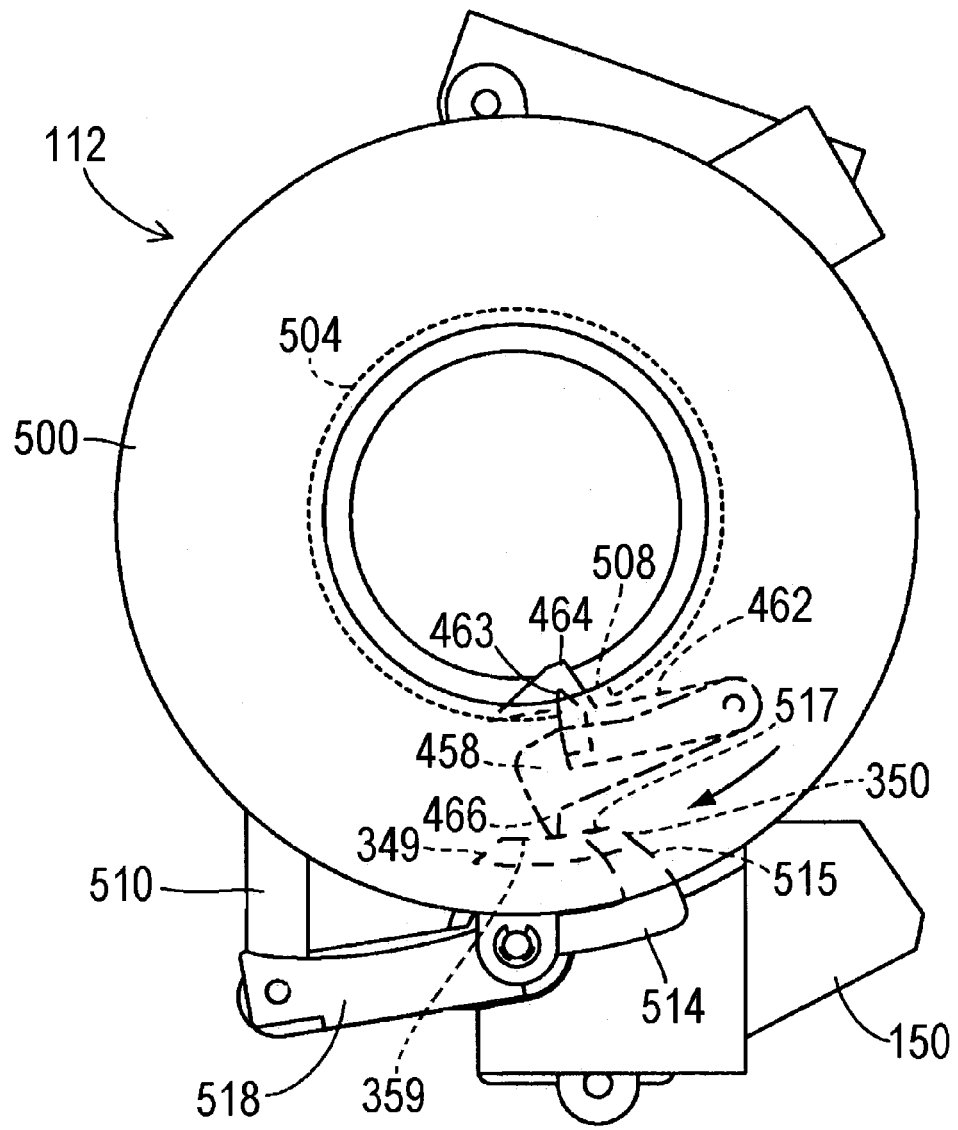
FIG. 11(A) is a more detailed view of the initial operation of the sub-pawls of the position maintaining mechanism when returning to a previous position.

When the rider provides a downshift command using shift control unit 84, then motor 150 pivots release control pawl 514 in the counterclockwise direction as shown in FIG. 10. As a result, release control abutment 517 extends through opening 515 in housing 100, presses against position maintaining tooth 466 of main position maintaining sub-pawl 458 to rotate it clockwise, and disengages positioning tooth 466 from positioning abutment 350. At the same time, abutment 465a in slot 465 allows main position maintaining sub-pawl contact ledge 463a and hence auxiliary position maintaining sub-pawl 462 to rotate clockwise (radially inward) in accordance with the biasing force of spring 492. As a result, moving member engaging portion 464 of auxiliary position maintaining sub-pawl 462 is positioned radially inward of cylindrical portion 504 of outer cover 112, and intermediate position maintaining portion 463 of auxiliary position maintaining sub-pawl 462 extends through cutout 508 as shown more specifically in FIGS. 11(A)–11(C). Lower pawl mounting member 320 and upper pawl mounting member 324 begin moving clockwise as a result of the disengagement of positioning tooth 466 from positioning abutment 350 and the biasing force of the return spring in front derailleur 70.

Cutout 508 in outer cover 112 allows main position maintaining sub-pawl 458 and auxiliary position maintaining sub-pawl 462 to rotate slightly clockwise. At the same time, lower pawl mounting member 320, upper pawl mounting member 324 and cable coupling plate 355 also rotate slightly clockwise to release first derailleur cable 120. However, as shown more clearly in FIG. 11(C), contact between the intermediate position maintaining portion 463 of auxiliary position maintaining sub-pawl 462 and the intermediate position maintaining abutment 509 formed on outer cover 112 prevents further rotation of auxiliary position maintaining sub-pawl 462, and hence lower pawl mounting member 320 and upper pawl mounting member 324, even after position maintaining tooth 466 of main position maintaining sub-pawl 458 is fully disengaged from positioning abutment 350. In this case, position maintaining tooth 466 of main position maintaining sub-pawl stops approximately half way across pawl decoupling wall 359. This is very helpful to prevent lower pawl mounting member 320, upper pawl mounting member 324 and cable coupling plate 355 from immediately moving counterclockwise to the middle speed position.

Figure 11B:
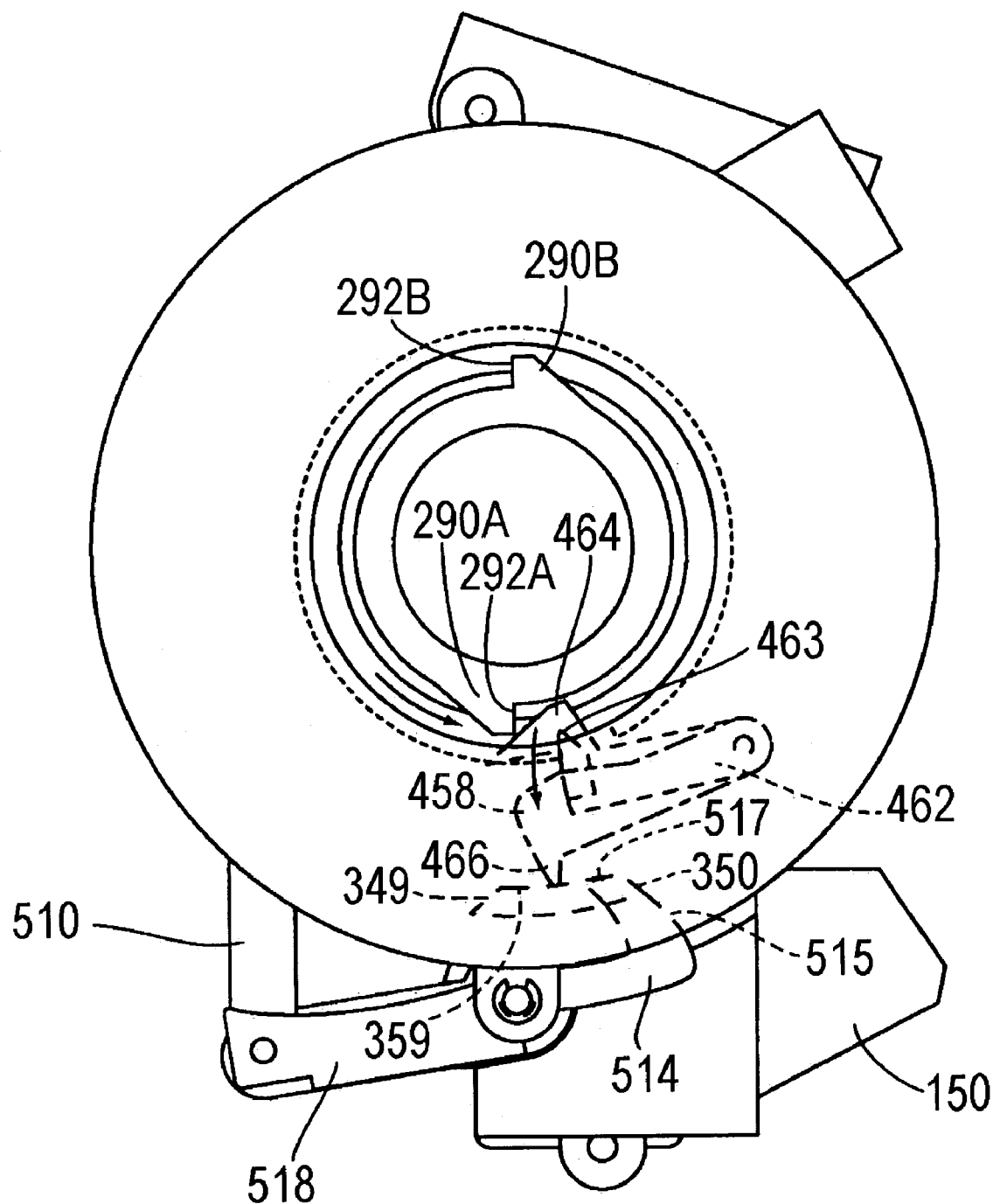
FIG. 11(B) is a more detailed view of the initial operation of the sub-pawls of the position maintaining mechanism just prior to engagement with the moving member.
Figure 11C:
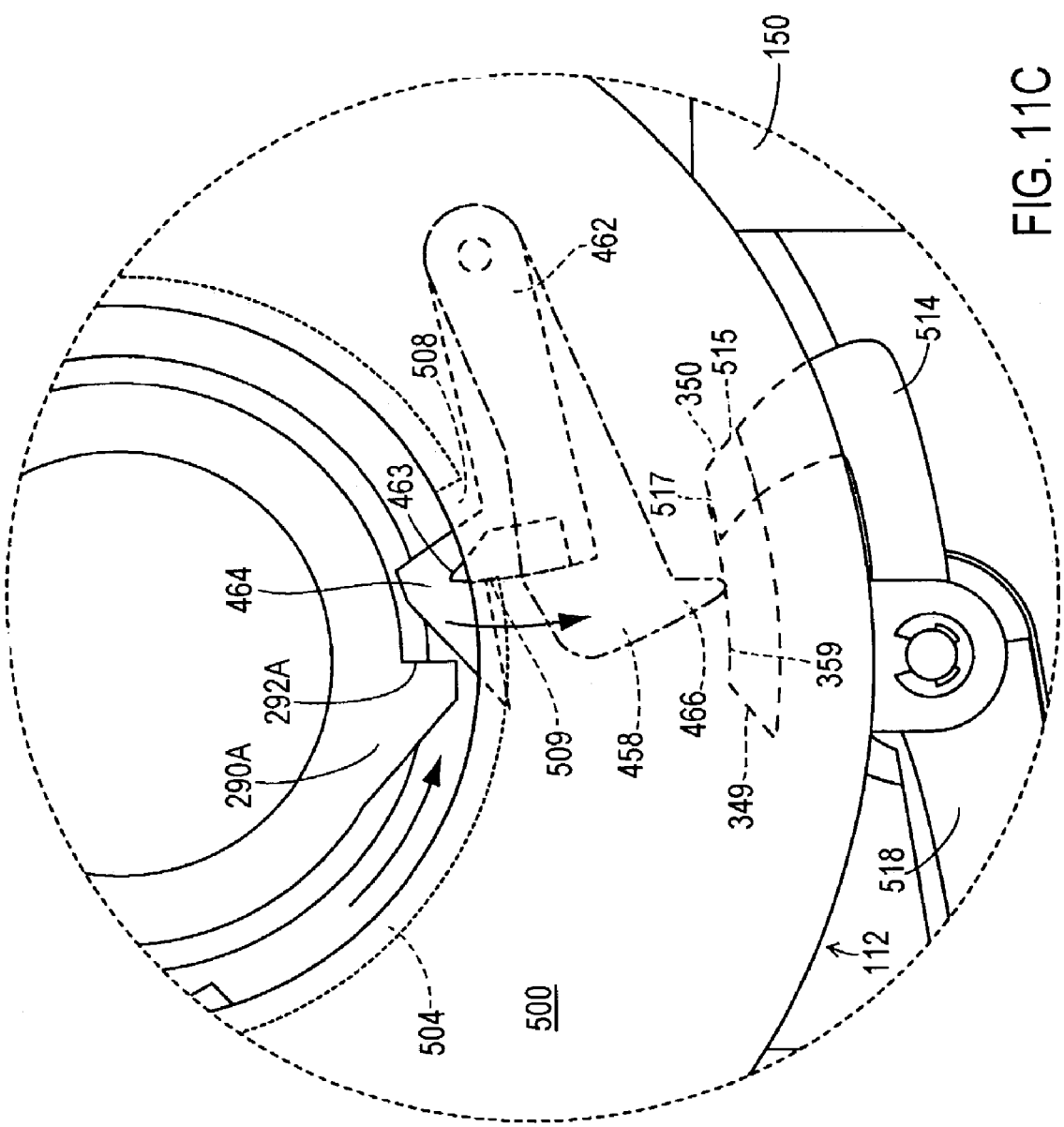
FIG. 11(C) is a close-up view of the initial operation of the sub-pawls of the position maintaining mechanism just prior to engagement with the moving member.
Figure 12:
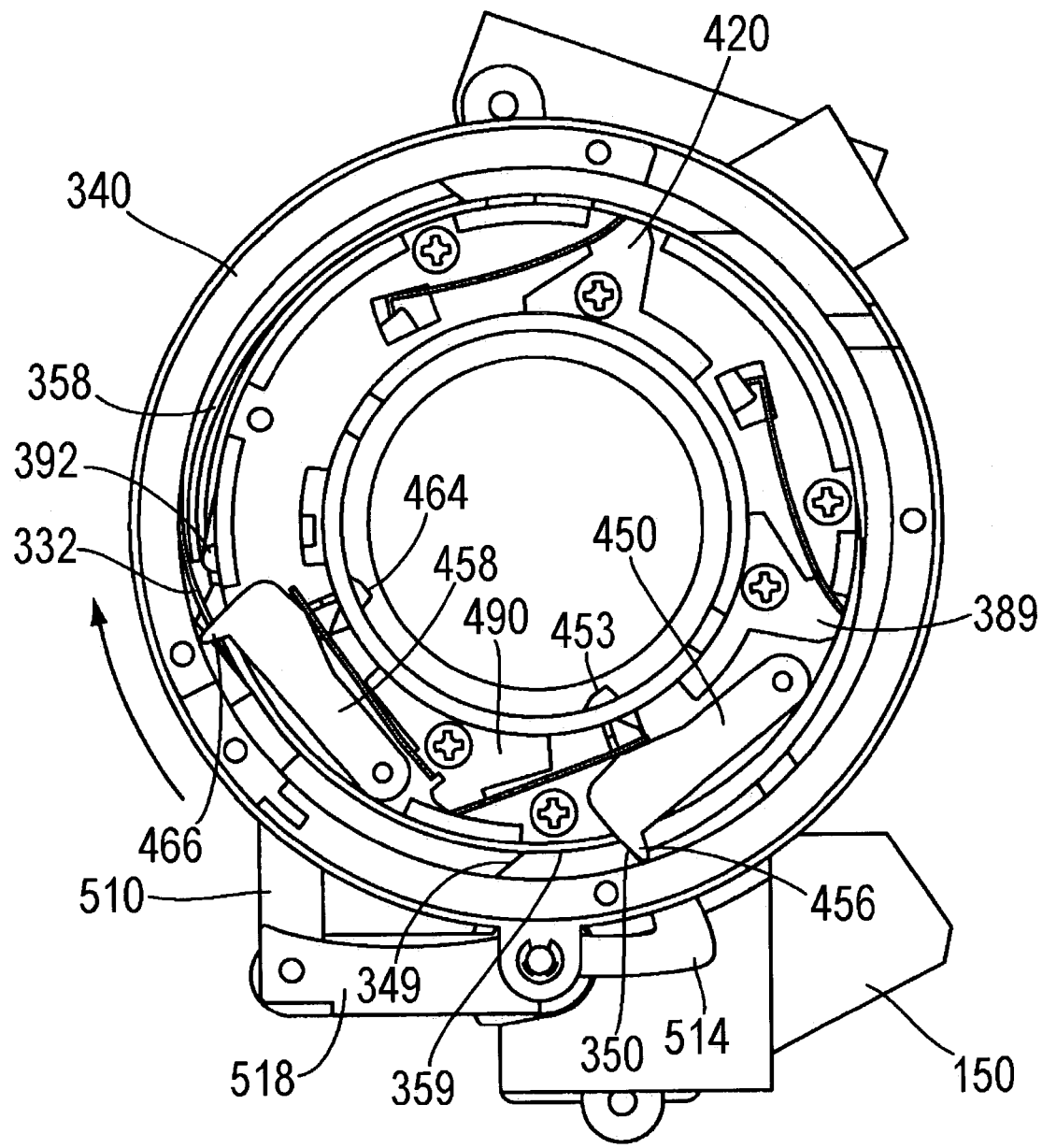
FIG. 12 is a view of the main position maintaining sub-pawls of the position maintaining mechanism after returning to the intermediate position.

On the other hand, moving member engaging portion 464 of auxiliary position maintaining sub-pawl 462 now is in a position to contact one of the abutments 292A or 292B on crank arm 128 as shown in FIGS. 11(B) and 11(C). Since moving member engaging portion 464 has an angled surface, auxiliary position maintaining sub-pawl 462 will be pushed radially outwardly by the abutment 292A or 292B, thus disengaging the intermediate position maintaining portion 463 of auxiliary position maintaining sub-pawl 462 from intermediate position maintaining abutment 509 on outer cover 112. This, in turn, allows lower pawl mounting member 320 and upper pawl mounting member 324, and hence auxiliary position maintaining sub-pawl 462 and main position maintaining sub-pawl 458, to rotate clockwise to the middle speed position shown in FIG. 12. This movement also is communicated to cable coupling plate 355 so that output wire assembly 78 is in the middle speed position.

The use of intermediate position maintaining abutment 509 on outer cover 112 and intermediate position maintaining portion 463 and moving member engaging portion 464 of auxiliary position maintaining sub-pawl 462 allows assist apparatus 14 to delay the rotation of lower pawl mounting plate 320, upper pawl mounting plate 324 and cable coupling plate 355 until one of the abutments 292A or 292B contacts the moving member engaging portion 464 of auxiliary position maintaining sub-pawl 462. This allows the timing of the shifting operation to be set very accurately. Such timing can be very important when chain shift facilitating structures are disposed on the sprockets. In other words, abutments 292A and 292B can be set at a specific angular position relative to the chain shift facilitating structures to enhance the shifting operation.

Figure 13:
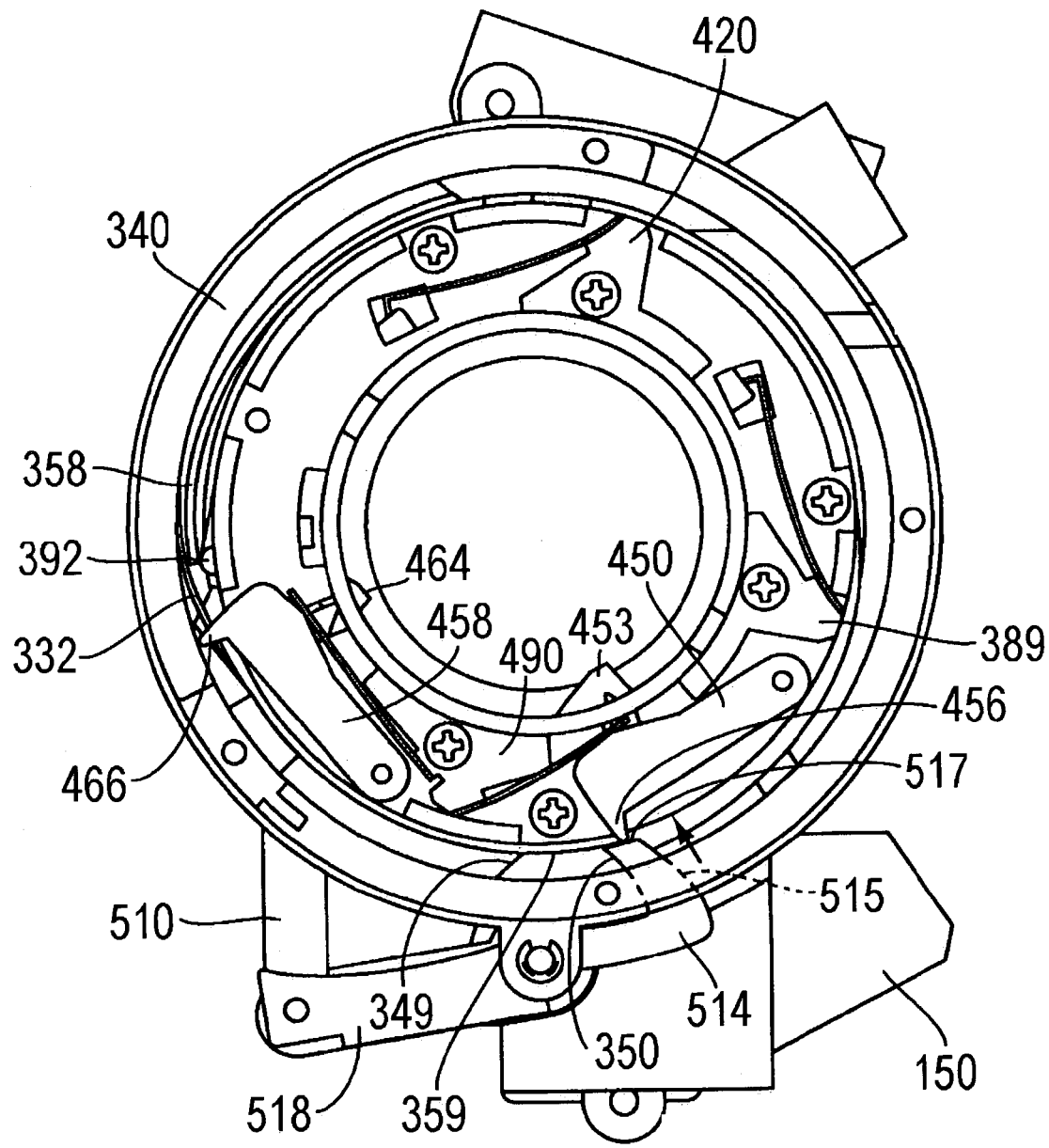
FIG. 13 is a view of the sub-pawls of the position maintaining mechanism when the rightmost main position maintaining sub-pawl is disengaged to move the power transfer mechanism toward the initial position.
Figure 14:
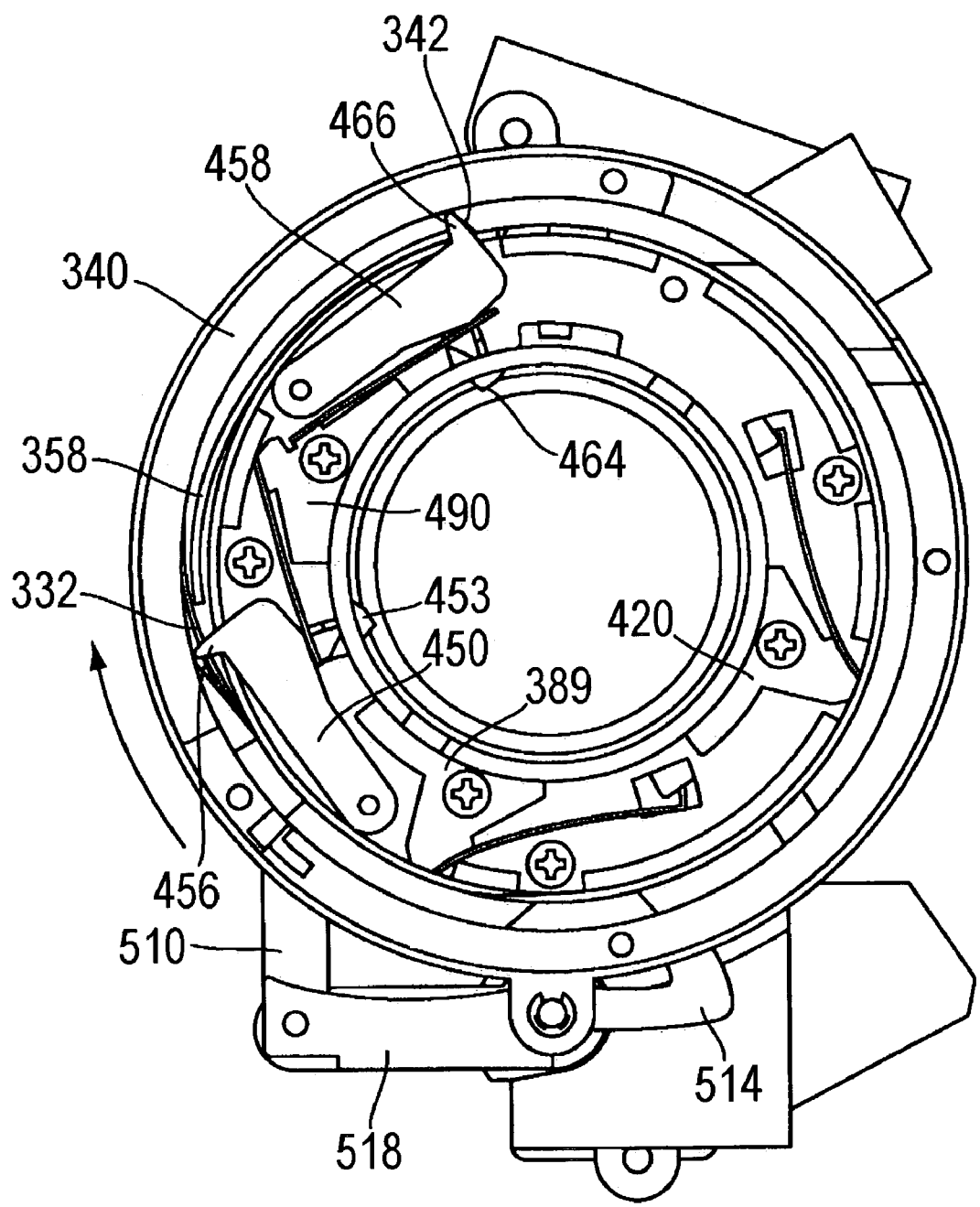
FIG. 14 is a view of the main position maintaining sub-pawls of the position maintaining mechanism after returning to the initial position.

When the rider again provides a downshift command using shift control unit 84, then motor 150 again pivots release control pawl 514 in the counterclockwise direction and release control abutment 517 extends through opening 515 in housing 100. Release control abutment 517 presses against position maintaining tooth 456 of main position maintaining sub-pawl 450 and disengages position maintaining tooth 456 from positioning abutment 350 as shown in FIG. 13. Assist apparatus 14 then operates in the same manner as described above to delay the rotation of lower pawl mounting plate 320, upper pawl mounting plate 324 and cable coupling plate 355 until one of the abutments 292A or 292B contacts the moving member engaging portion 453 of auxiliary position maintaining sub-pawl 454. When that happens, auxiliary position maintaining sub-pawl 454 will be pushed radially outwardly by the abutment 292A or 292B, thereby allowing auxiliary position maintaining sub-pawl 454 and main position maintaining sub-pawl 450 to rotate clockwise to the low speed position as shown in FIG. 14. This movement also is communicated to lower pawl mounting member 320, upper pawl mounting member 324, and cable coupling plate 355 so that output control wire assembly is in the low speed position.

Figure 15:
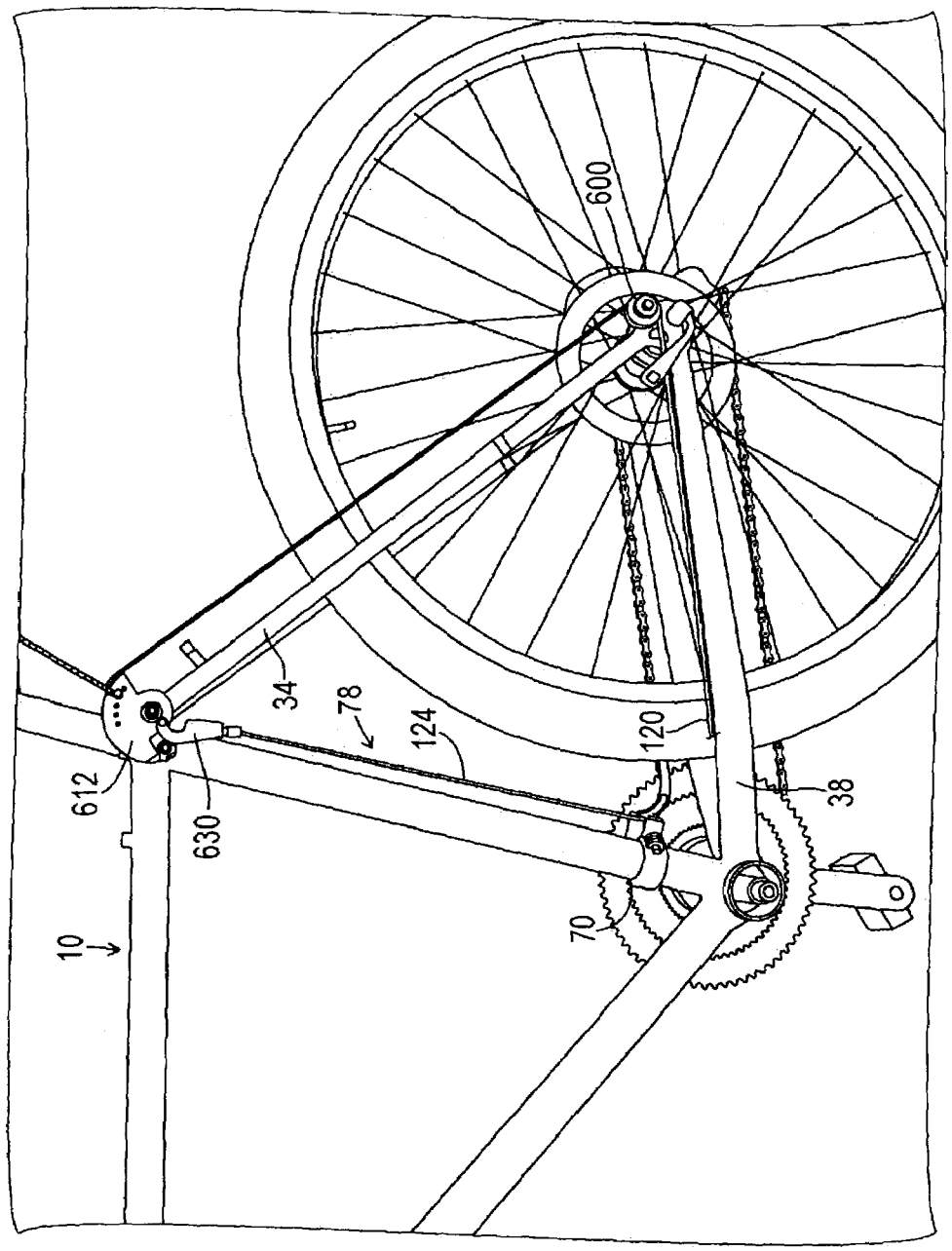
FIG. 15 is a side view of the bicycle showing a particular embodiment of cabling between the shift assist apparatus and the front derailleur.
Figure 16:
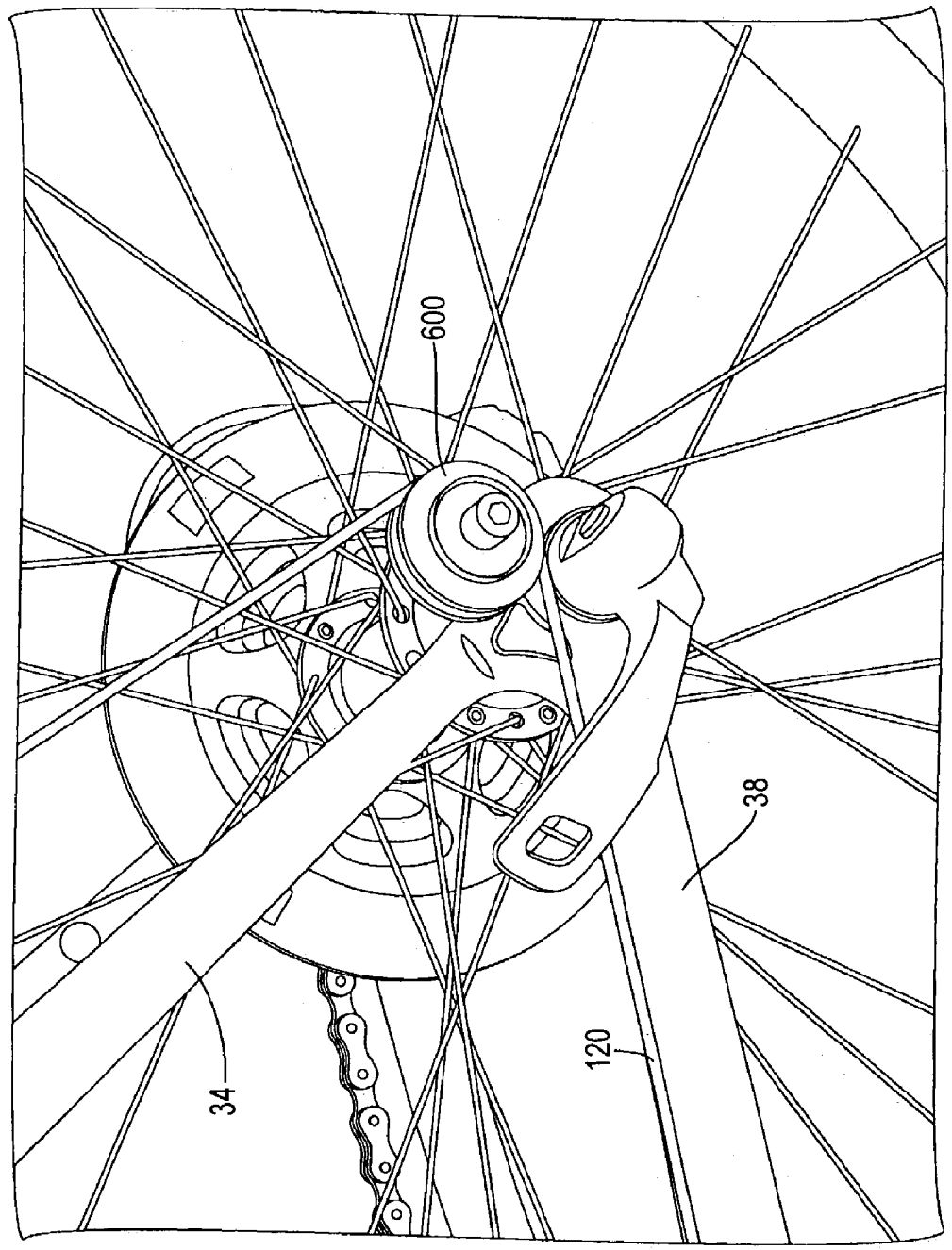
FIG. 16 is a closer view of a particular embodiment of a cable diverter mounted to the rear of the bicycle.

FIG. 15 is a side view of a particular embodiment of bicycle 10 showing an embodiment of a control wire assembly 78 between the assist apparatus 14 and the front derailleur 70 (assist apparatus 14 has been removed in this figure). In this embodiment, it may be desirable to reduce the wire stroke between the cable coupling plate 355 of assist apparatus 14 and front derailleur 70. To that end, first derailleur cable 120 extends from cable coupling plate 355 in assist apparatus 14 toward the rear of the bicycle. As shown in FIGS. 15 and 16, first derailleur cable 120 passes around a cable diverter in the form of a roller 600 that is rotatably mounted to the junction of the left side seat stay 34 and chain stay 38. Thereafter, first derailleur cable 120 proceeds toward saddle 39.

Figure 17:
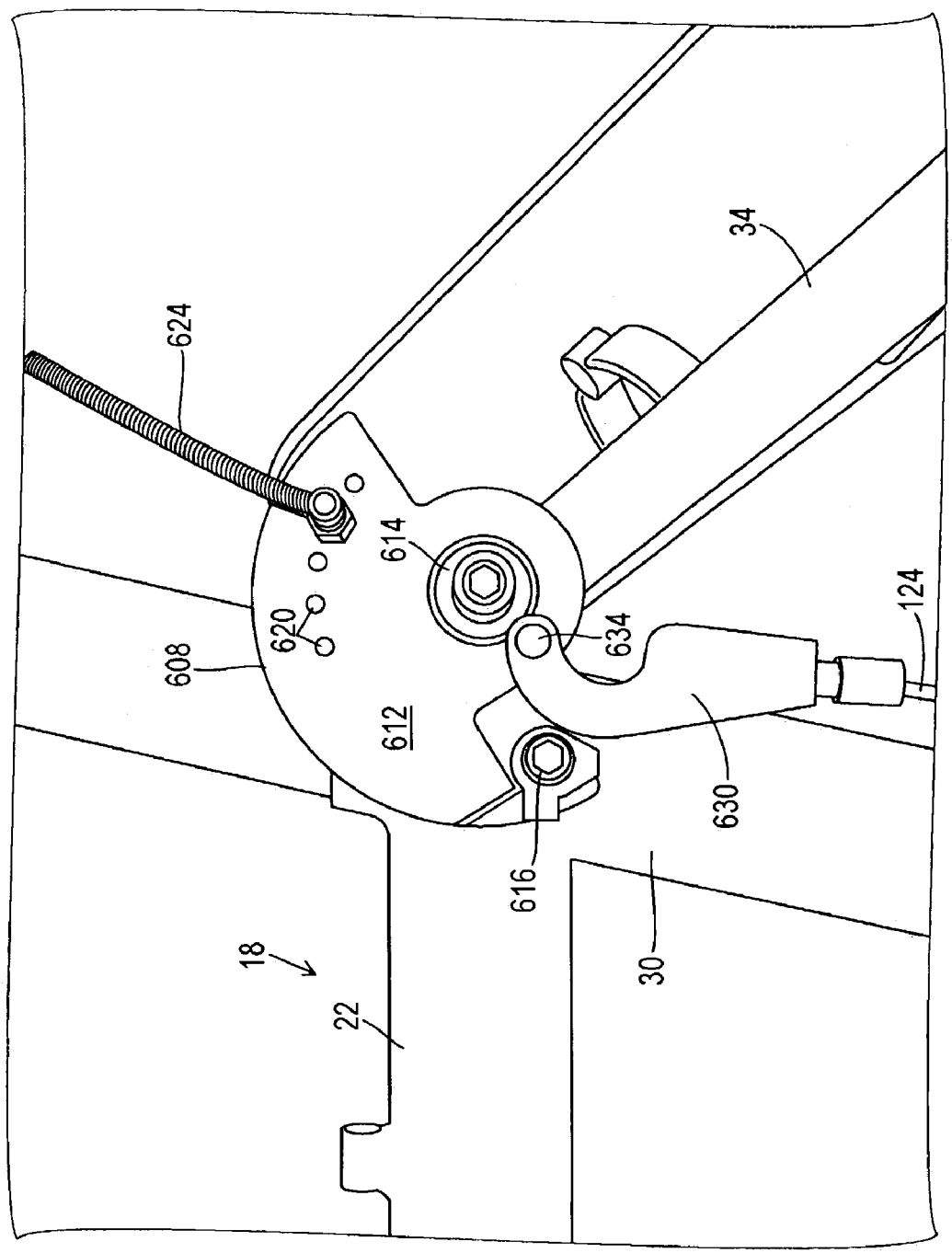
FIG. 17 is a closer view of a particular embodiment of a cam mechanism mounted to the upper portion of the bicycle.

As shown in FIG. 17, first derailleur cable 120 passes along a winding surface 608 of a cam 612 that is rotatably mounted through a bearing assembly 614 to frame 18 at a junction between top tube 22, seat tube 30 and seat stays 34. The terminal portion of first derailleur cable 120 terminates at a cable fastener 616. Cam 612 includes a plurality of bias adjusting openings 620 that may be selectively coupled to a biasing spring 624. Biasing spring 624 may be used to set the initial position of cam 612 and to provide a biasing force to derailleur 70. In this embodiment, biasing spring 624 is coupled to seat 39. A coupling hook 630 is rotatably coupled to cam 612 through a pivot shaft 634. Coupling hook 630 is coupled to second derailleur cable 124 which, in turn, is fastened to front derailleur 70. This arrangement can reduce the wire stroke by approximately one half.

In another embodiment, the derailleur cable exiting assist apparatus 14 may be fastened directly to front derailleur 70, and the wire stroke may be modified by constructing the derailleur using cams, gear reduction mechanisms, and so on. Alternatively, the wire stroke may be adjusted by altering the radial location of the cable coupling opening 356 on cable coupling plate 355. In another embodiment, annular cable coupling plate 355 may be eliminated. In this case, lower pawl mounting member 320 may be configured with a cam 700 as shown in FIG. 4(B), and output control wire assembly 78 may be attached to a lever (not shown) that cooperates with cam 700 in a manner disclosed in U.S. Pat. No. 6,443,032.

While the above is a description of various embodiments of inventive features, further modifications may be employed without departing from the spirit and scope of the present invention. For example, while an electrically operated motor 150 was used to move drive control abutment 512, a mechanical shift control device could be used instead. While the various members were adapted to rotate and cooperate with rotating members, movements other than rotation may be accommodated. The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An assisting apparatus for using power from a moving member to assist the operation of a bicycle transmission comprising:
    a power transfer mechanism, wherein the power transfer mechanism moves in one of a first direction and a second direction to upshift the bicycle transmission, and wherein the power transfer mechanism moves in the other one of the first direction and the second direction to downshift the bicycle transmission;
    a drive coupling mechanism that moves toward the moving member to couple the power transfer mechanism to the moving member to move the power transfer mechanism in one of the first direction and the second direction; and
    a position maintaining mechanism that prevents the power transfer mechanism from moving in the other one of the first direction and the second direction.

2. The apparatus according to claim 1 wherein the drive coupling mechanism comprises a first moving member engaging member that moves between a first moving member engaging position and a first moving member disengaging position.

3. The apparatus according to claim 2 wherein the drive coupling mechanism further comprises a moving member engaging member retaining mechanism that retains the first moving member engaging member in the first moving member disengaging position.

4. The apparatus according to claim 3 wherein the moving member engaging member retaining mechanism comprises a movable moving member engaging member retainer.

5. The apparatus according to claim 3 wherein the moving member engaging member retaining mechanism comprises a fixed moving member engaging member retainer.

6. The apparatus according to claim 3 wherein the drive coupling mechanism further comprises a moving member engaging member releasing mechanism that allows the first moving member engaging member to move from the first moving member disengaging position toward the first moving member engaging position.

7. The apparatus according to claim 6 wherein the drive coupling mechanism further comprises a moving member engaging member reset mechanism that resets the first moving member engaging member into the first moving member disengaging position.

8. The apparatus according to claim 6 wherein the moving member engaging member retaining mechanism comprises:
    a movable moving member engaging member retainer;
    a fixed moving member engaging member retainer; and
    wherein the first moving member engaging member engages one of the movable moving member engaging member retainer and the fixed moving member engaging member retainer when the first moving member engaging member is in the first moving member disengaging position.

9. The apparatus according to claim 8 wherein the drive coupling mechanism comprises a second moving member engaging member that moves between a second moving member engaging position and a second moving member disengaging position.

10. The apparatus according to claim 9 wherein the first moving member engaging member engages one of the movable moving member engaging member retainer and the fixed moving member engaging member retainer when the first moving member engaging member is in the first moving member disengaging position, and wherein the second moving member engaging member engages the other one of the movable moving member engaging member retainer and the fixed moving member engaging member retainer when the second moving member engaging member is in the second moving member disengaging position.

11. The apparatus according to claim 10 wherein movement of the movable moving member engaging member retainer allows the one of the first moving member engaging member and the second moving member engaging member that engages it to move toward the corresponding first moving member engaging position and second moving member engaging position.

12. The apparatus according to claim 1 wherein the position maintaining mechanism comprises a first position maintaining member that moves between a first position maintaining position and a first position releasing position.

13. The apparatus according to claim 12 wherein the first position maintaining member engages a fixed member when the first position maintaining member is in the first position maintaining position to prevent movement of the power transfer mechanism.

14. The apparatus according to claim 13 further comprising a position releasing mechanism that disengages the first position maintaining member from the fixed member to allow movement of the power transfer mechanism.

15. The apparatus according to claim 14 wherein the position releasing mechanism further comprises an intermediate position maintaining mechanism that maintains the first position maintaining member in an intermediate position when the first position maintaining member is disengaged from the fixed member.

16. The apparatus according to claim 15 wherein the intermediate position maintaining mechanism comprises:
   an intermediate position maintaining member supported to the first position maintaining member; and
   an intermediate position maintaining abutment that engages the intermediate position maintaining member to prevent movement of the power transfer mechanism.

17. The apparatus according to claim 16 wherein the position releasing mechanism further comprises a release moving member engaging member structured to engage the moving member, wherein the intermediate position maintaining member disengages from the intermediate position maintaining abutment when the release moving member engaging member engages the moving member.

18. The apparatus according to claim 1 wherein the power transfer mechanism rotates around a power transfer axis, wherein the drive coupling mechanism is coupled to the power transfer mechanism for rotation around the power transfer axis, and wherein the position maintaining mechanism is coupled to the power transfer mechanism for rotation around the power transfer axis.

19. The apparatus according to claim 18 further comprising a fixed member adapted to be fixed relative to a frame of a bicycle.

20. The apparatus according to claim 19 wherein the drive coupling mechanism engages the moving member at a radially inward location of the power transfer mechanism, and wherein the position maintaining mechanism engages the fixed member at a radially outward location of the power transfer mechanism.

21. An assisting apparatus for using power from a rotating member to assist the operation of a bicycle transmission comprising:
   a power transfer mechanism, wherein the power transfer mechanism rotates in one of a clockwise direction and a counterclockwise direction to upshift the bicycle transmission, and wherein the power transfer mechanism rotates in the other one of the clockwise and the counterclockwise direction to downshift the bicycle transmission;
   a drive coupling mechanism that couples the power transfer mechanism to the rotating member to rotate the power transfer mechanism in one of the clockwise direction and the counterclockwise direction, wherein the drive coupling mechanism comprises:
      a first moving member engaging member that moves between a first moving member engaging position and a first moving member disengaging position;
      a moving member engaging member retaining mechanism that retains the first moving member engaging member in the first moving member disengaging position;
      a moving member engaging member releasing mechanism that allows the first moving member engaging member to move from the first moving member disengaging position toward the first moving member engaging position; and
      a moving member engaging member reset mechanism that resets the first moving member engaging member into the first moving member disengaging position;
   a position maintaining mechanism that prevents the power transfer mechanism from rotating in the other one of the clockwise direction and the counterclockwise direction, wherein the position maintaining mechanism comprises a first position maintaining member that moves between a first position maintaining position and a first position releasing position, wherein the first position maintaining member engages a fixed member when the first position maintaining member is in the first position maintaining position to prevent rotation of the power transfer mechanism; and
   a position maintaining member releasing mechanism that disengages the first position maintaining member from the fixed member to allow rotation of the power transfer mechanism.

22. The apparatus according to claim 21 wherein the drive coupling mechanism further comprises a second moving member engaging member that moves between a second moving member engaging position and a second moving member disengaging position, wherein the moving member engaging member retaining mechanism retains the second moving member engaging member in the second moving member disengaging position, and wherein the moving member engaging member releasing mechanism allows the second moving member engaging member to move toward the second moving member engaging position.

23. The apparatus according to claim 22 wherein the moving member engaging member retaining mechanism comprises:
   a movable moving member engaging member retainer;
   a fixed moving member engaging member retainer;
   wherein the first moving member engaging member engages one of the movable moving member engaging member retainer and the fixed moving member engaging member retainer when the first moving member engaging member is in the first moving member disengaging position; and
   wherein the second moving member engaging member engages the other one of the movable moving member engaging member retainer and the fixed moving member engaging member retainer when the second moving member engaging member is in the second moving member disengaging position.

24. The apparatus according to claim 23 wherein the moving member engaging member releasing mechanism comprises the movable moving member engaging member retainer, wherein movement of the movable moving member engaging member retainer allows the one of the first moving member engaging member and the second moving member engaging member that engages it to move toward the corresponding first moving member engaging position and second moving member engaging position.

25. The apparatus according to claim 24 wherein the movable moving member engaging member retainer comprises a retaining abutment that maintains the one of the first moving member engaging member and the second moving member engaging member that engages it in the corresponding moving member disengaging position.

26. The apparatus according to claim 25 wherein movement of the movable moving member engaging member retainer disengages the abutment from the one of the first moving member engaging member and the second moving member engaging member that engages it.

27. An assisting apparatus for using power from a moving member to assist the operation of a bicycle transmission comprising:
   a power transfer mechanism, wherein the power transfer mechanism moves in one of a first direction and a second direction to upshift the bicycle transmission, and wherein the power transfer mechanism moves in the other one of the first direction and the second direction to downshift the bicycle transmission;
   a drive coupling mechanism that couples the power transfer mechanism to the moving member to move the power transfer mechanism in the one of the first direction and the second direction, wherein the drive coupling mechanism comprises:
      a first moving member engaging member that moves between a first moving member engaging position and a first moving member disengaging position;
      a moving member engaging member retaining mechanism that retains the first moving member engaging member in the first moving member disengaging position;
      a moving member engaging member releasing mechanism that allows the first moving member engaging member to move from the first moving member disengaging position toward the first moving member engaging position; and
      a moving member engaging member reset mechanism that resets the first moving member engaging member into the first moving member disengaging position;
   a position maintaining mechanism that prevents the power transfer mechanism from moving in the other one of the first direction and the second direction, wherein the position maintaining mechanism comprises a first position maintaining member that moves between a first position maintaining position and a first position releasing position, wherein the first position maintaining member engages a fixed member when the first position maintaining member is in the first position maintaining position to prevent movement of the power transfer mechanism;
   an overshift mechanism that allows the power transfer mechanism to move temporarily beyond a position corresponding to where the position maintaining mechanism ordinarily engages the fixed member to prevent movement of the power transfer mechanism; and
   a position maintaining member releasing mechanism that disengages the first position maintaining member from the fixed member to allow movement of the power transfer mechanism.

28. The apparatus according to claim 27 wherein the overshift mechanism comprises a resilient member.

29. The apparatus according to claim 27 wherein the overshift mechanism forms a part of the moving member engaging member reset mechanism.

30. The apparatus according to claim 29 wherein the moving member engaging member reset mechanism comprises:
   a decoupling ramp that causes the first moving member engaging member to move to the first moving member disengaging position; and
   a decoupling wall that retains the first moving member engaging member in the first moving member disengaging position.

31. The apparatus according to claim 30 wherein the decoupling ramp comprises a resilient member.

32. The apparatus according to claim 31 wherein the decoupling ramp comprises a leaf spring.

33. The apparatus according to claim 30 wherein a surface of the decoupling ramp faces a first surface of the decoupling wall.

34. The apparatus according to claim 33 wherein the first moving member engaging member moves between the surface of the decoupling ramp and the first surface of the decoupling wall and is retained in the first moving member disengaging position at a second surface of the decoupling wall that is opposite the first surface of the decoupling wall.

35. The apparatus according to claim 34 wherein the decoupling ramp comprises a leaf spring.

36. An assisting apparatus for using power from a moving member to assist the operation of a bicycle transmission comprising:
   a power transfer mechanism, wherein the power transfer mechanism moves in one of a first direction and a second direction to upshift the bicycle transmission, and wherein the power transfer mechanism moves in the other one of the first direction and the second direction to downshift the bicycle transmission;
   a drive coupling mechanism that couples the power transfer mechanism to the moving member to move the power transfer mechanism in one of the first direction and the second direction;
   a position maintaining mechanism that prevents the power transfer mechanism from moving in the other one of the first direction and the second direction; and
   wherein the drive coupling mechanism and the position maintaining mechanism together comprise:
      a mounting member;
      a moving member engaging member coupled to the mounting member, wherein the moving member engaging member moves between a first moving member engaging position and a first moving member disengaging position;
      a position maintaining member coupled to the mounting member, wherein the position maintaining member moves between a first position maintaining position and a first position releasing position; and
      wherein the mounting member, the moving member engaging member and the position maintaining member are coupled together so that the mounting member, the moving member engaging member and the position maintaining member may be removed as a unit from the assisting apparatus.

* * * * *